(12) United States Patent
Ghassemlou et al.

(10) Patent No.: US 7,861,644 B2
(45) Date of Patent: Jan. 4, 2011

(54) BEVERAGE MAKER

(75) Inventors: Paul Ghassemlou, Anaheim Hills, CA (US); Victor Eisa, Reseda, CA (US); Amrik S. Sidhu, Corona, CA (US)

(73) Assignee: C&D Zodiac, Inc., Huntington Beach, CA (US)

( * ) Notice: Subject to any disclaimer, the term of this patent is extended or adjusted under 35 U.S.C. 154(b) by 191 days.

(21) Appl. No.: 11/695,538

(22) Filed: Apr. 2, 2007

(65) Prior Publication Data

US 2007/0272085 A1  Nov. 29, 2007

Related U.S. Application Data

(60) Provisional application No. 60/788,191, filed on Mar. 31, 2006.

(51) Int. Cl.
*A47J 31/00* (2006.01)

(52) U.S. Cl. .................. 99/281; 99/283; 99/285; 99/302 R

(58) Field of Classification Search .................. 99/281, 99/280, 282, 283, 302 R, 307, 306, 285
See application file for complete search history.

(56) References Cited

U.S. PATENT DOCUMENTS

| | | | |
|---|---|---|---|
| 3,485,162 A | 12/1969 | Hopkinson et al. | |
| 3,596,588 A * | 8/1971 | Moss | 99/282 |
| 3,878,772 A | 4/1975 | Nordskog | |
| 4,334,141 A * | 6/1982 | Roller et al. | 392/467 |
| 4,343,988 A * | 8/1982 | Roller et al. | 392/467 |
| 4,478,139 A | 10/1984 | Zimmerman | |
| 4,665,808 A * | 5/1987 | Pulvermuller | 99/285 |
| 4,949,627 A * | 8/1990 | Nordskog | 99/281 |
| 5,150,448 A | 9/1992 | Salomon | |
| 5,480,054 A | 1/1996 | Midden | |
| 5,647,269 A | 7/1997 | Miller et al. | |
| 5,676,040 A | 10/1997 | Ford | |
| 5,687,635 A | 11/1997 | Stockton et al. | |
| 5,738,001 A | 4/1998 | Liverani | |

(Continued)

FOREIGN PATENT DOCUMENTS

EP  0771542  5/1997

(Continued)

*Primary Examiner*—Reginald L Alexander
(74) *Attorney, Agent, or Firm*—Dean W. Russell; Kilpatrick Stockton LLP

(57) ABSTRACT

The present invention provides a beverage maker having an in-line heating assembly for heating water to make hot beverages such as coffee and tea. The heating assembly defines a flow path that runs past a plurality of heaters for heating water to a desired temperature. In this manner, the beverage maker heats water as it travels, alleviating the need for a water tank or vessel, resulting in increased savings in weight and size, as well as reducing brew time. Additionally, an optical sensor assembly is provided to detect when a serving container of the beverage maker has a prescribed capacity of liquid within it. The sensor assembly includes at least one light source aligned to shine into the container and at least one detector aligned to detect light reflected off the liquid surface within the container. A drainage assembly is also provided that can drain liquid through either a connector port into an airplane's wastewater system or through a drainage port into a drainage sump.

3 Claims, 21 Drawing Sheets

U.S. PATENT DOCUMENTS

| | | |
|---|---|---|
| 5,899,137 A | 5/1999 | Miller et al. |
| 5,906,844 A | 5/1999 | Stahli et al. |
| 6,047,630 A | 4/2000 | Brown et al. |
| 6,050,175 A | 4/2000 | Mirand et al. |
| 6,227,101 B1 * | 5/2001 | Rabadi et al. ........... 99/280 |
| 6,234,364 B1 | 5/2001 | Nybakke et al. |
| 6,634,279 B2 | 10/2003 | D'Antonio et al. |
| 6,705,208 B2 | 3/2004 | Lassota |
| 6,779,435 B1 * | 8/2004 | Iacobucci ............ 99/302 R |
| 7,017,408 B2 | 3/2006 | Ramus et al. |
| 7,210,400 B2 | 5/2007 | Kaminishi et al. |
| 7,644,650 B2 * | 1/2010 | Suzuki ........... 99/280 |
| 2004/0079237 A1 | 4/2004 | Denisart |
| 2005/0178197 A1 | 8/2005 | Ramus et al. |
| 2005/0279216 A1 * | 12/2005 | Miller ........... 99/279 |
| 2007/0289452 A1 * | 12/2007 | Hofer et al. ........... 99/295 |

FOREIGN PATENT DOCUMENTS

| | | |
|---|---|---|
| WO | WO9950172 | 10/1999 |
| WO | WO0045685 | 8/2000 |
| WO | WO2005048794 | 6/2005 |

* cited by examiner

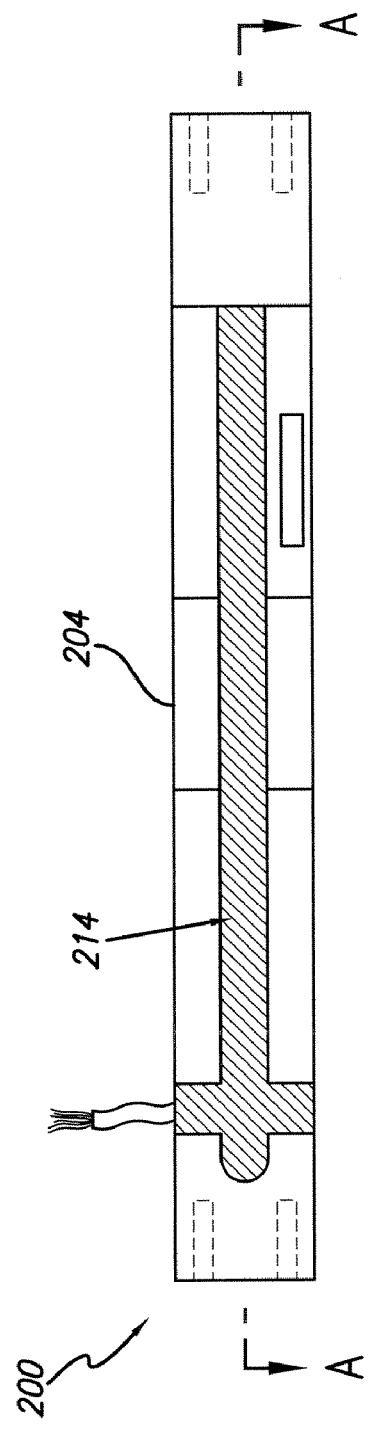
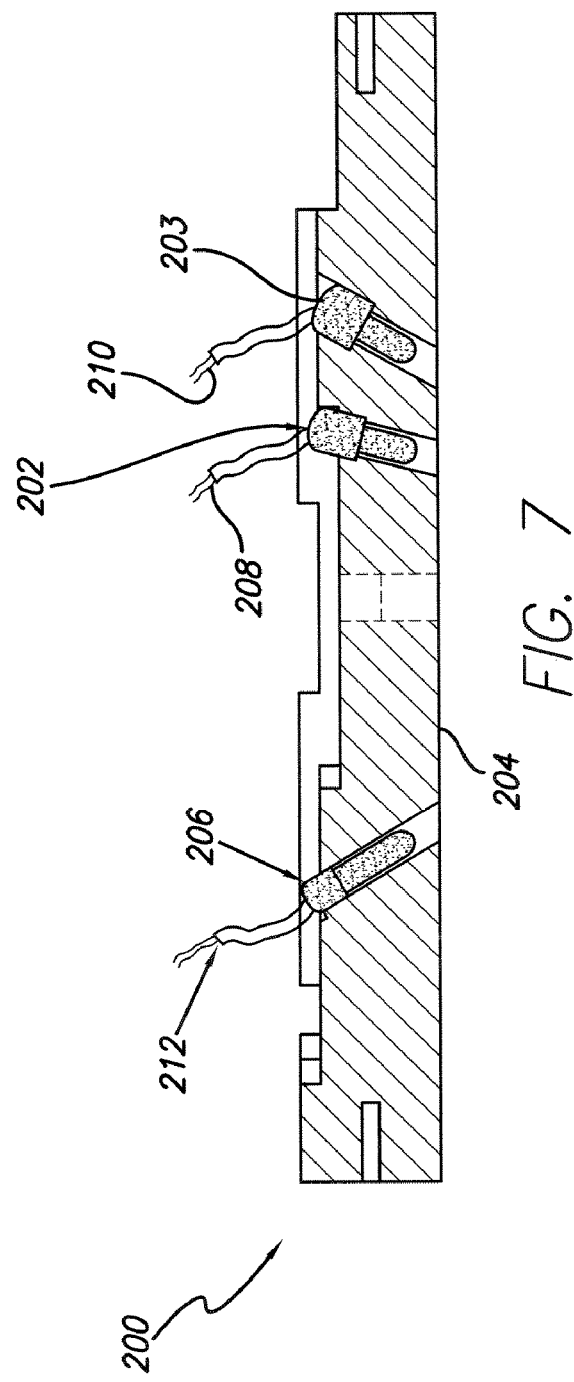

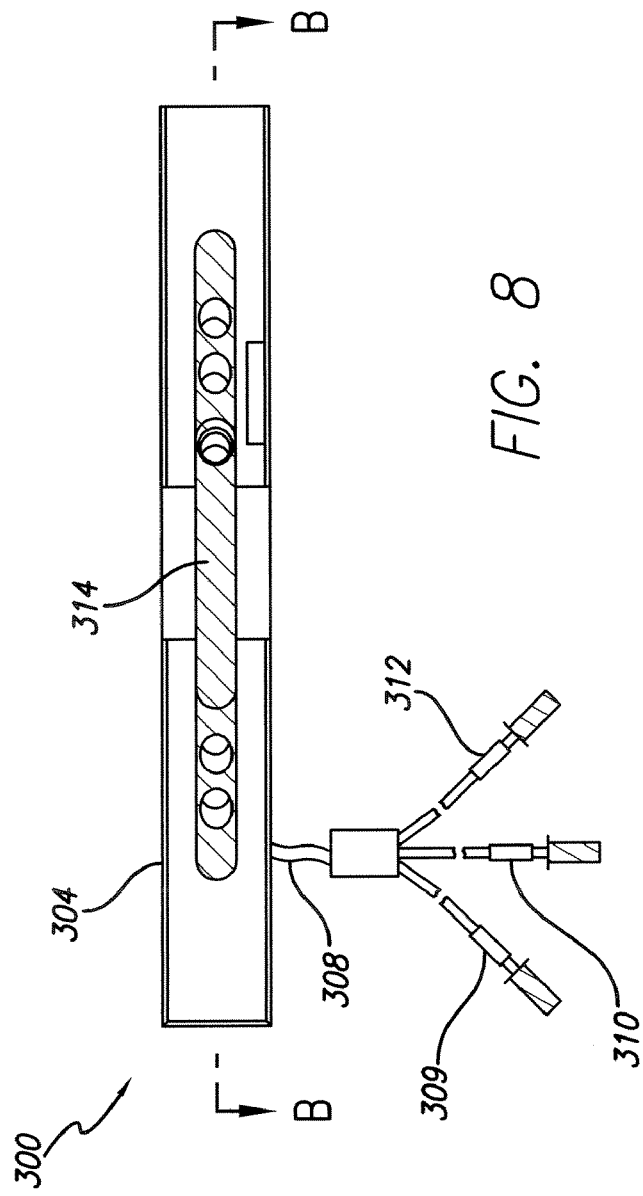
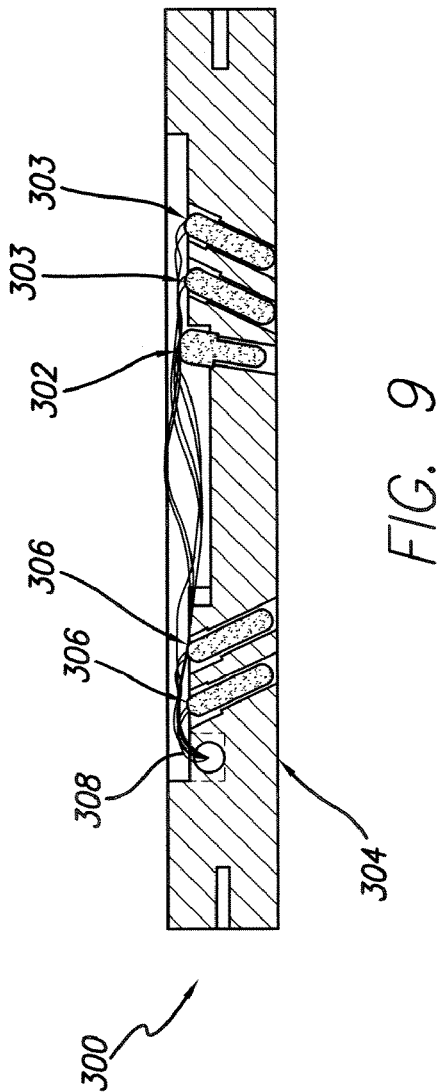

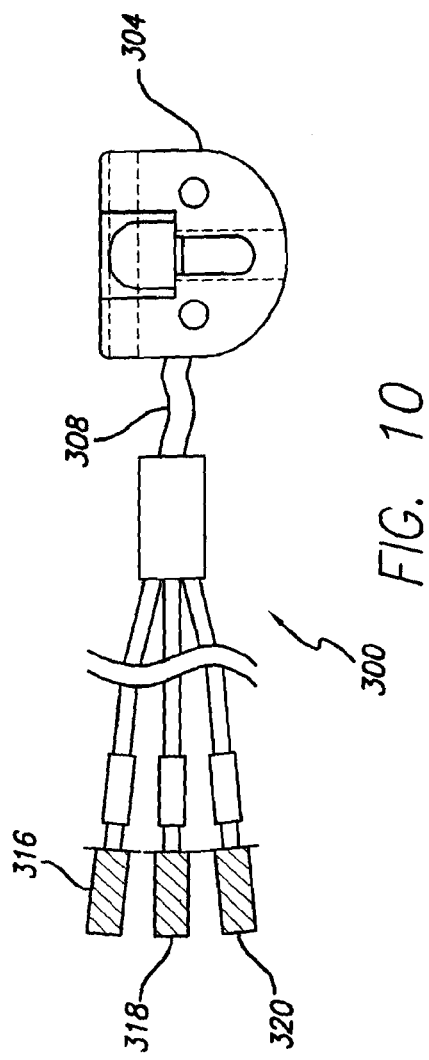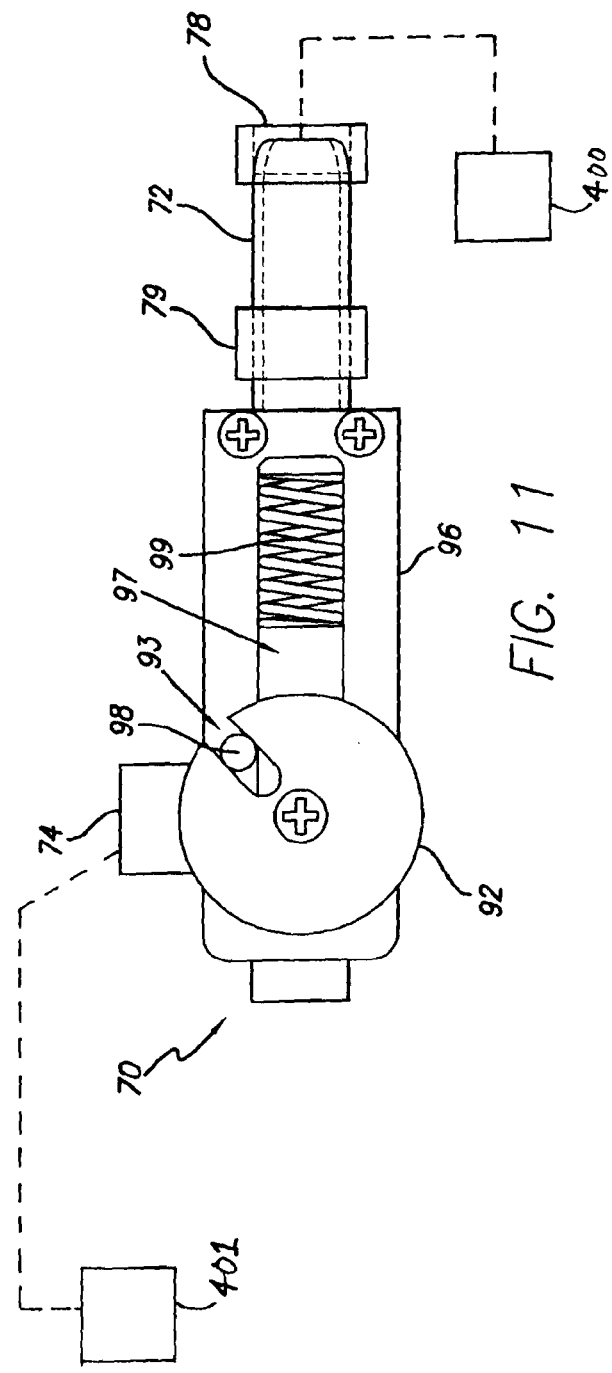

BEVERAGE MAKER

CROSS-REFERENCE TO RELATED APPLICATION

This application claims priority to U.S. Provisional Application Ser. No. 60/788,191 filed Mar. 31, 2006, the contents of which are incorporated by reference in their entirety.

BACKGROUND OF THE INVENTION

The present invention relates generally to beverage makers and, more particularly, to beverage makers configured for use in transport vehicles to include commercial airplanes.

Traditionally, to brew coffee, coffee grounds are held in a filter. Hot water is dripped onto the coffee grounds, allowing the water to absorb the coffee flavor, and then the resulting coffee seeps through the filter into a serving container. It is critical that the water is heated properly.

Commercial transportation operators have traditionally provided hot beverages, such as coffee and tea, to their passengers. To that end, galleys of commercial carriers, such as commercial airlines, typically include a beverage maker. As with many components within a commercial aircraft, such beverage makers must be compact and yet provide robust operations.

In traditional designs for beverage makers, water is stored in a heating tank. The tank heats the entire volume of water to a desired temperature. Once heated, the water is released to initiate the brewing process. This can be a time-consuming process. Moreover, the tank can be relatively heavy and take up much-needed space.

It should therefore be appreciated that there remains a need for a beverage maker that addresses the aforementioned shortfalls. The present invention fulfills this need and others.

SUMMARY OF THE INVENTION

Briefly, and in general terms, the present invention provides a beverage maker having an in-line heating assembly for heating water to make hot beverages such as coffee and tea. In an exemplary embodiment, the heating assembly defines a flow path that runs past a plurality of heaters for heating water to a desired temperature. In this manner, the beverage maker heats water as it travels, alleviating the need for a water tank or vessel, resulting in increased savings in weight and size, as well as reducing brew time.

In an exemplary embodiment of a beverage maker in accordance with the invention, the beverage maker is configured to be connected to an external water source. The heating assembly defines a flow path for the received water that runs past a plurality of heaters as the water travels. In this manner, the beverage maker heats the water without need for a water tank or vessel, providing increased savings in weight and size.

In a detailed aspect of an exemplary embodiment of the invention, the heating assembly includes a body that defines a flow path for heating the water. The body can be formed of a unitary block of lightweight material having high insulating properties. Various materials can be used, e.g., polymers, glass fiber composites, and other materials having satisfactory properties.

Temperature sensors can be provided along the flow path of the heating assembly to measure temperature at various locations. These measurements can aid in ensuring a desired water temperature. For example, temperature levels of the heating elements and the flow rate of water through the heating assembly can be controlled to achieve a desired liquid temperature as the water exits the heating assembly.

In another detailed aspect of an exemplary embodiment, an optical sensor assembly can be provided to detect when a serving container of the beverage maker has a prescribed capacity of liquid within it. The sensor assembly includes at least one visible light LED aligned to shine into the container and at least one photoelectric sensor aligned to detect light reflected off the liquid surface within the container.

The LEDs are held at prescribed angles by a bracket or bar positioned above the serving container and are angled to shine through an opening defined in an upper portion of the serving container. The photoelectric sensors are positioned to sense light from the LEDs as it reflects off the liquid surface within the serving container. In one embodiment, a phototransistor and an LED are oriented such that the phototransistor will receive a peak level of light reflected off the liquid surface, once the liquid within the serving container achieves a prescribed level. In another embodiment, two photoelectric sensors and three LEDs are oriented such that the photoelectric sensors can sense the intensity of the light reflecting off of the liquid, which depends upon the changing distance between the photoelectric sensors and the liquid level. In this manner, the beverage maker can guard against overflow of the serving container.

In yet another detailed aspect of an exemplary embodiment of the invention, a drainage assembly is provided that can drain liquid through either a connector port or a drainage port, depending upon the configuration of the particular galley. The connector port is configured to mate to a complementary port within certain galleys that provides conductivity to the airplane's wastewater system. In other types of galleys, such ports are not provided. Instead, a drainage sump (not shown) is located below the beverage maker. If the connector port is connected, then the drainage assembly drains through the connector port. If the connector port is not connected, then the drainage assembly drains through the drainage port.

For purposes of summarizing the invention and the advantages achieved over the prior art, certain advantages of the invention have been described herein. Of course, it is to be understood that not necessarily all such advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other advantages as may be taught or suggested herein.

All of these embodiments are intended to be within the scope of the invention herein disclosed. These and other embodiments of the present invention will become readily apparent to those skilled in the art from the following detailed description of the preferred embodiments having reference to the attached figures, the invention not being limited to any particular preferred embodiment disclosed.

BRIEF DESCRIPTION OF THE DRAWINGS

Embodiments of the present invention will now be described, by way of example only, with reference to the following drawings in which:

FIG. 6 is a top view of an optical sensor assembly bar for the beverage maker of FIG. 1.

FIG. 7 is a side cross-sectional view of the optical sensor assembly bar of FIG. 6, depicting two LEDs and one photoelectric sensor.

FIG. 8 is a top view of a three-LED optical sensor assembly for the beverage maker of FIG. 1.

FIG. 9 is a side cross-sectional view of the three-LED optical sensor assembly of FIG. 8.

FIG. 10 is a left elevational view of the three-LED optical sensor assembly of FIG. 8.

FIG. 11 is a top view of a drainage assembly for the beverage maker of FIG. 1.

DETAILED DESCRIPTION OF THE PREFERRED EMBODIMENTS

Figure 1:
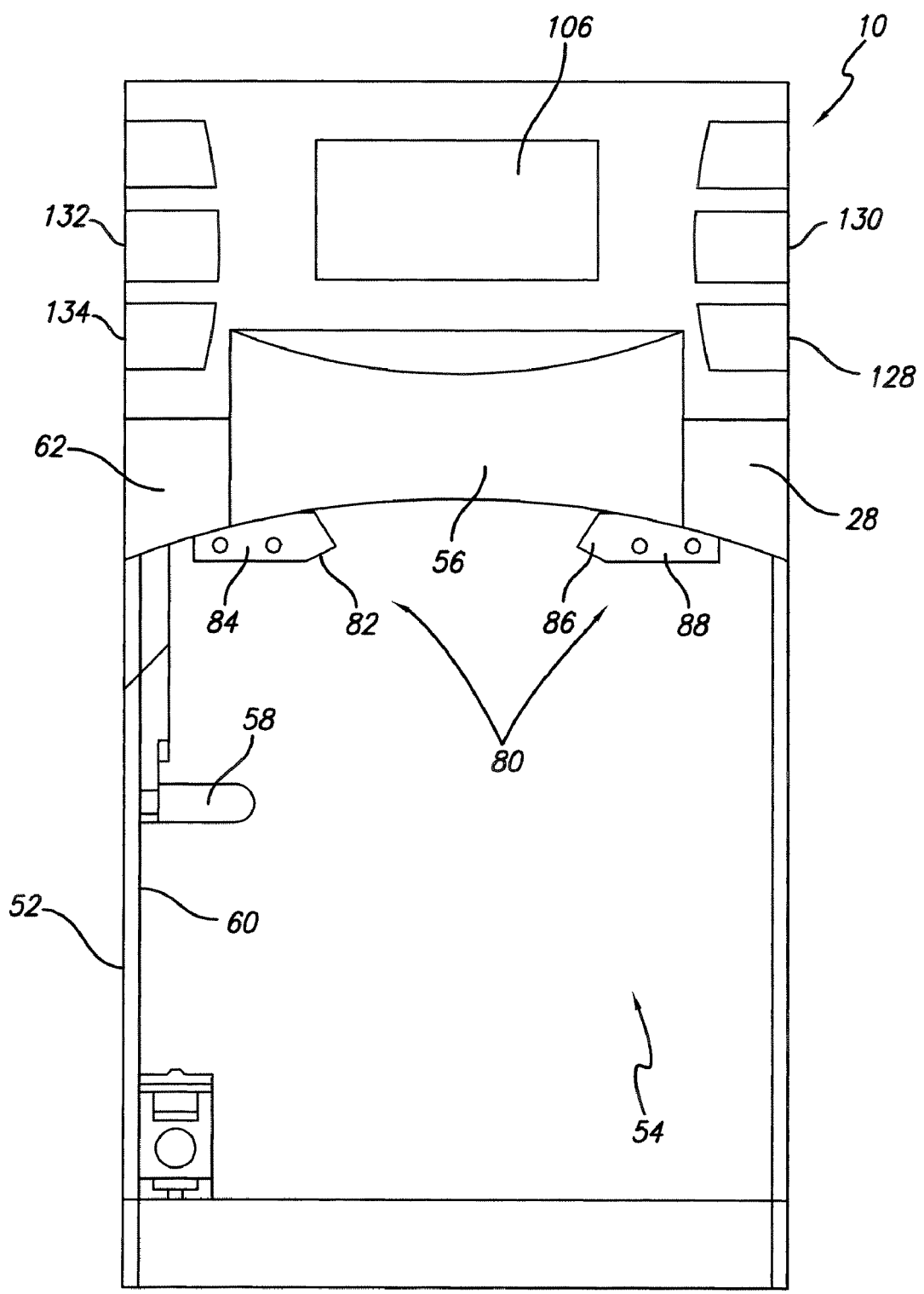
FIG. 1 is a front elevational view of a beverage maker in accordance with the invention.
Figure 2:
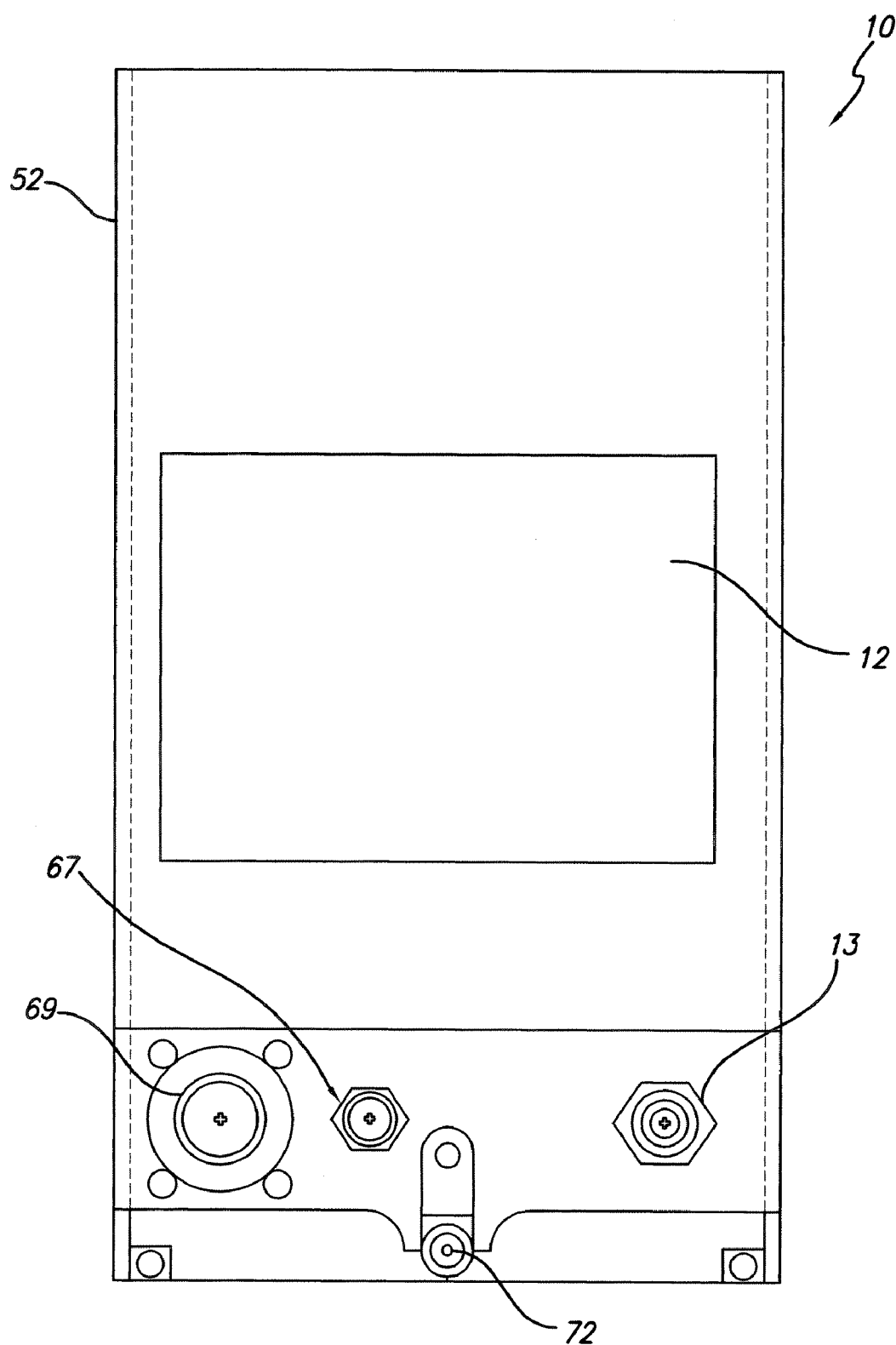
FIG. 2 is a back elevational view of the beverage maker of FIG. 1, depicting a portion of the heating assembly and connection ports.

Referring now to the drawings, and particularly FIGS. 1 and 2, there is shown a beverage maker 10 having an in-line heating assembly 12 for heating water to make hot beverages such as coffee and tea. In the exemplary embodiment, the beverage maker is connected to an external water source 150 (FIG. 18), such as a water system provided for in a galley of a commercial airliner, though a water inlet plug 13. The heating system is configured to heat the water received for use. The heating assembly defines a flow path 14 for the received water that runs past a plurality of heaters 16. In this manner, the beverage maker heats the water without need for a water tank or vessel, providing increased savings in weight and size.

Figure 3:
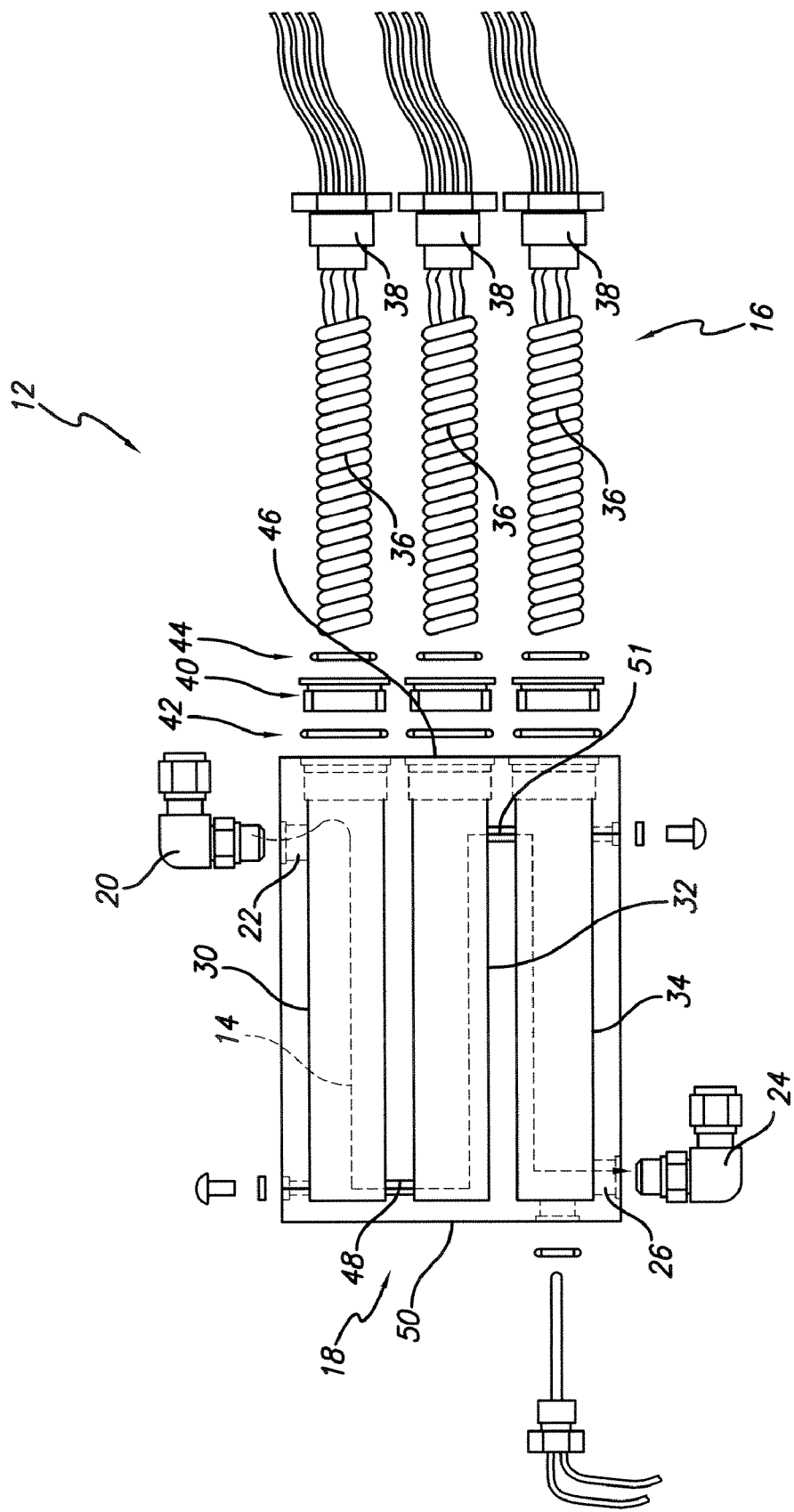
FIG. 3 is a partially exploded view of the heating assembly for the beverage maker of FIG. 1.

With reference to FIG. 3, the heating assembly 12 includes a body 18 that defines the flow path 14 for heating the water. In the exemplary embodiment, the body is formed of a lightweight material having high insulating properties. Various materials can be used, e.g., polymers, glass fiber composites, polycarbonates, and other materials having satisfactory properties. For example, fluoropolymer resins, such as those available from E. I. du Pont de Nemours and Company under the trademark Teflon®, are effective. In the exemplary embodiment, the body has a width of 4.90 inches, a thickness of 1.50 inches, and a length of 5.25 inches, although the present invention encompasses bodies having different dimensions.

The heating assembly 12 includes an input valve 20 disposed at a first end 22 of the flow path 14 and an output valve 24 at a second end 26 of the flow path. The input valve provides water from an external water source to the flow path defined by the body 18. Once in the body, the water runs past the heaters 16 to heat the water to a desired temperature. Then, the water exits the body through the output valve for use.

In the exemplary embodiment, the body 18 defines three elongated, generally cylindrical bores, an upper bore 30, a middle bore 32, and a lower bore 34, for receiving the heaters. In the exemplary embodiment, three immersion heaters 16 are used, such as those available from Durex Industries, Inc., having a place of business in Cary, Ill. However, various other types of heaters can be used, for example, cartridge heaters, band heaters, cast-in heaters, and so on.

Each heater 16 is generally cylindrical, and it includes a heating element 36 that spirals outward from a base portion 38. Each heating element extends substantially the entire length of the corresponding bore. A cylindrical insert 40 is disposed at an open end of each bore to aid in securing the respective heater in place. The insert is sandwiched by first and second O-rings 42 and 44 to ensure a watertight seal.

In use, water enters the upper bore 30 via the input valve 20 near a first side 46 of the body. The water travels substantially the entire length of the upper bore to a first channel 48 that extends between the upper bore and the middle bore 32, adjacent to a second side 50 of the body. In the middle bore, the water travels from the first channel to a second channel 51 located adjacent to the first side of the body. The second channel connects the middle bore to the lower bore 34. In this manner, the flow path 14 keeps the water in close contact with the heating elements 36 of the heaters 26, allowing the water to heat rapidly. The flow path travels generally downward, while within a confined space.

Figure 18:
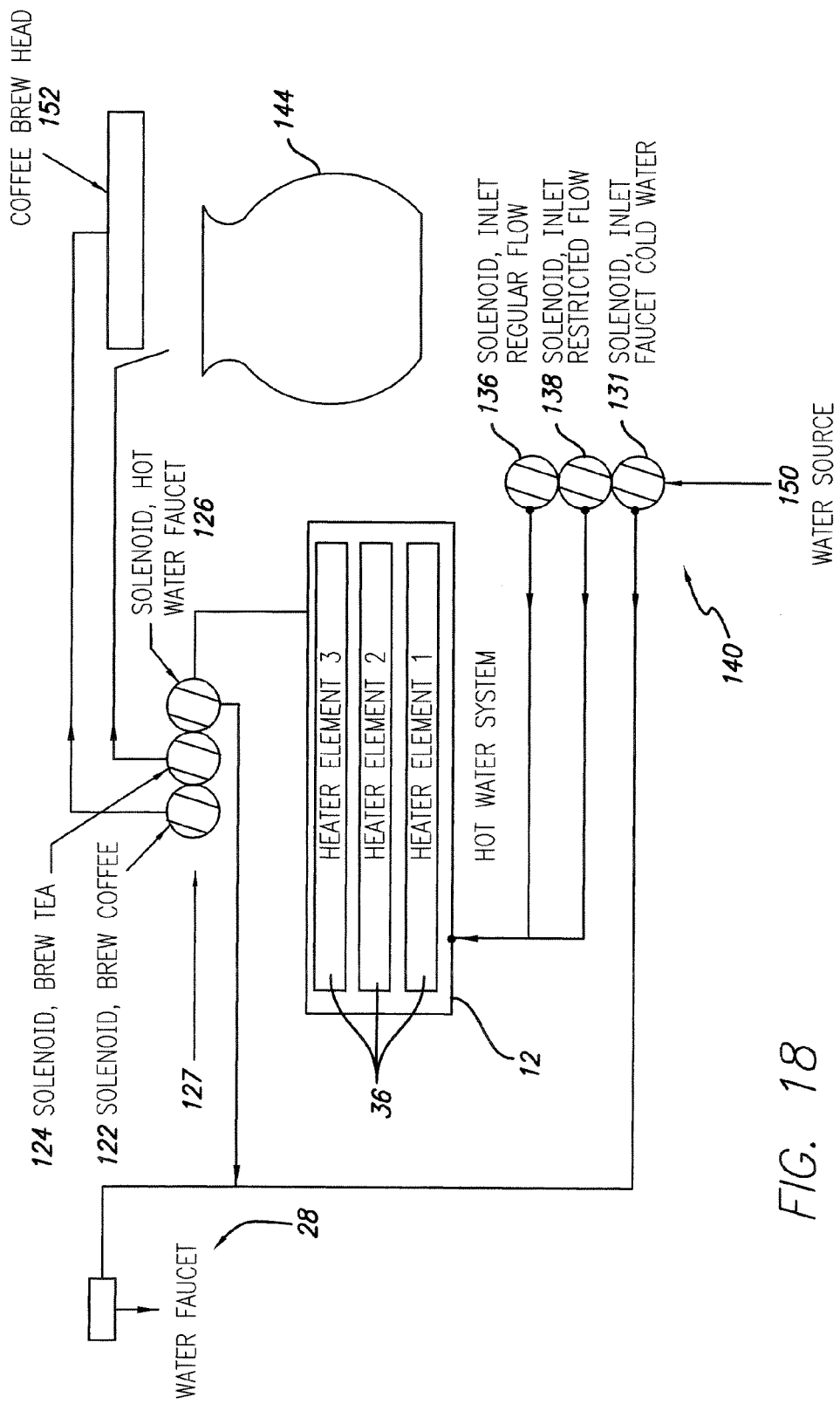
FIG. 18 is a simplified block diagram of the beverage maker of FIG. 1, depicting the flow paths of liquids through the beverage maker.

With reference again to FIGS. 1 and 2, the beverage maker 10 includes a housing 52 that defines a recess 54 for receiving a serving container 144 (FIG. 18). When stowed in the recess, the serving container is positioned below a filter tray 56 that is used to hold coffee grounds within a filter. In use, coffee drips from the filter tray into the serving container. The serving container is secured in place by a retainer bracket 58 positioned on a side wall 60 of the housing. The retainer bracket is operatively connected to lock button 62 positioned adjacent to the filter tray. A sensor (not shown) is operatively coupled to the retainer bracket and senses whether the serving container is locked in place. This sensor communicates with a controller 108 to ensure that brewing cannot initiate without a server container locked in place.

The beverage maker 10 further includes an optical sensor assembly 80 that can detect when the serving container has a prescribed level of liquid within it. The sensor assembly includes a visible light LED 82 held at a prescribed angle by a first bracket 84, positioned above the serving container. The LED is angled to shine through an opening defined in an upper portion of the serving container. In the exemplary embodiment, an LED is used, at a wavelength between about 600 nm and 680 nm and more preferably between about 620 nm and 650 nm and most preferably between about 620 nm and 625 nm. More particularly, a 5 mm, solid state LED (T-1¾) from Kingbright Corp., having a place of business in City of Industry, Calif., is used. In other embodiments, other LEDs and LEDs at other wavelengths can be used, with selection based in part upon the geometry of the beverage maker and serving container, other components selected for the beverage maker, and cost, among other factors.

The optical sensor assembly 80 further includes a phototransistor 86 held at a prescribed angle by a second bracket 88, positioned above the serving container and spaced apart from the first bracket. The phototransistor is angled to sense the light from the LED 82 as it reflects off the liquid surface within the serving container. In the exemplary embodiment, a silicon photodarlington phototransistor is used, such as those available from Fairchild Semiconductor Corp., having a place of business in South Portland, Me.

The phototransistor 86 and the LED 82 are oriented such that the phototransistor will receive a peak level of light reflected off the liquid surface, once the liquid within the serving container achieves a prescribed level. In this manner, the beverage maker can guard against overflow of the serving container.

With reference now to FIGS. 6 and 7, there is shown a top view and a side cross-sectional view of a two-LED alternative embodiment of an optical sensor assembly 200 that can detect when the serving container has a prescribed level of liquid within it. The optical sensor assembly 200 includes two visible light LEDs 202 and 203 held at prescribed orientations by a bar 204, positioned above the serving container. The LED 202 emits light at an orange wavelength and receives signals from the controller 108 via wires 208. More particularly, an orange LED having a typical wavelength of about 611 nm from ROHM Co., Ltd., having a place of business in Kyoto, Japan, is used. The LED 203 emits white light and receives signals from the controller 108 via wires 210. More particularly, a white LED from LITE-ON Technology Corp., having a place of business in Taipei, Taiwan, is used. In other embodiments, other LEDs and LEDs emitting light at other wavelengths can be used, with selection based in part upon the geometry of the beverage maker and serving container, other components selected for the beverage maker, and cost, among other factors.

The optical sensor assembly 200 further includes a photoelectric sensor 206 held at a prescribed orientation by the bar 204. The photoelectric sensor 206 is positioned above the serving container and is spaced apart from the LEDs 202 and 203. The photoelectric sensor 206 is oriented to sense light emitted by the LEDs 202 and 203 and reflected from the upper surface of liquid located within the serving container. The photoelectric sensor sends signals to the controller 108 via wires 212.

The bar 204 is configured to have a channel 214 that extends lengthwise along the middle of its upper side, from slightly past the LEDs 202 and 203 to slightly past the photoelectric sensor 206. The tops of the LEDs and photoelectric sensor protrude into the channel 214. The channel 214 is filled with a sealing material, such as epoxy, that secures the LEDs and photoelectric sensor in place. Wires 210, 212 and 214 can be buried within the sealing material and exit the channel in one group, as is shown in FIG. 6.

With reference now to FIGS. 8-10, there is shown a top view, a side cross-sectional view, and a left elevational view of a three-LED alternative embodiment of an optical sensor assembly 300 that can detect when the serving container has a prescribed level of liquid within it. The optical sensor assembly 300 includes an orange light LED 302 and two white light LEDs 303 that are held at prescribed orientations by a bar 304, positioned above the serving container. The LED 302 emits light at an orange wavelength and receives signals from the controller 108 via a bundle of wires 308. More particularly, an orange LED having a typical wavelength of about 611 nm from ROHM Co., Ltd., having a place of business in Kyoto, Japan, is used. The two LEDs 303 emit white light and also receive signals from the controller 108 via the bundle of wires 308. More particularly, white LEDs from LITE-ON Technology Corp., having a place of business in Taipei, Taiwan, are used. In other embodiments, other LEDs and LEDs emitting light at other wavelengths can be used, with selection based in part upon the geometry of the beverage maker and serving container, other components selected for the beverage maker, and cost, among other factors.

The optical sensor assembly 300 further includes two photoelectric sensors 306 embedded in the bar 304. The photoelectric sensors 306 are positioned above the serving container and are spaced apart from the LEDs 302 and 303. The photoelectric sensors 306 are oriented to sense the light emitted by the LEDs 302 and 303 and reflected from the upper surface of liquid within the serving container. The photoelectric sensors send signals to the controller 108 via the bundle of wires 308.

The bar 304 is configured to have a channel 314 that extends lengthwise along the middle of its upper side, from slightly past the LEDs 302 and 303 to slightly past the photoelectric sensors 306. The tops of the LEDs and photoelectric sensors protrude into the channel 314. The channel 314 is filled with a sealing material, such as epoxy, that secures the LEDs and photoelectric sensors in place.

The wires connected to the LEDs 302 and 303 and the photoelectric sensors 306 can be buried within the sealing material and exit the channel in one group, as is shown in FIGS. 8 and 10. The bundle of wires 308 contains three sets of wires. Wires 309 send signals from the controller 108 to the LEDs. The wires 310 and 312 send signals from the photoelectric sensors 306 to the controller 108. The pins 316 connect the wires 309 to the controller 108, the pins 318 connect the wires 310 to the controller 108, and the pins 320 connect the wires 312 to the controller 108.

Figure 4:
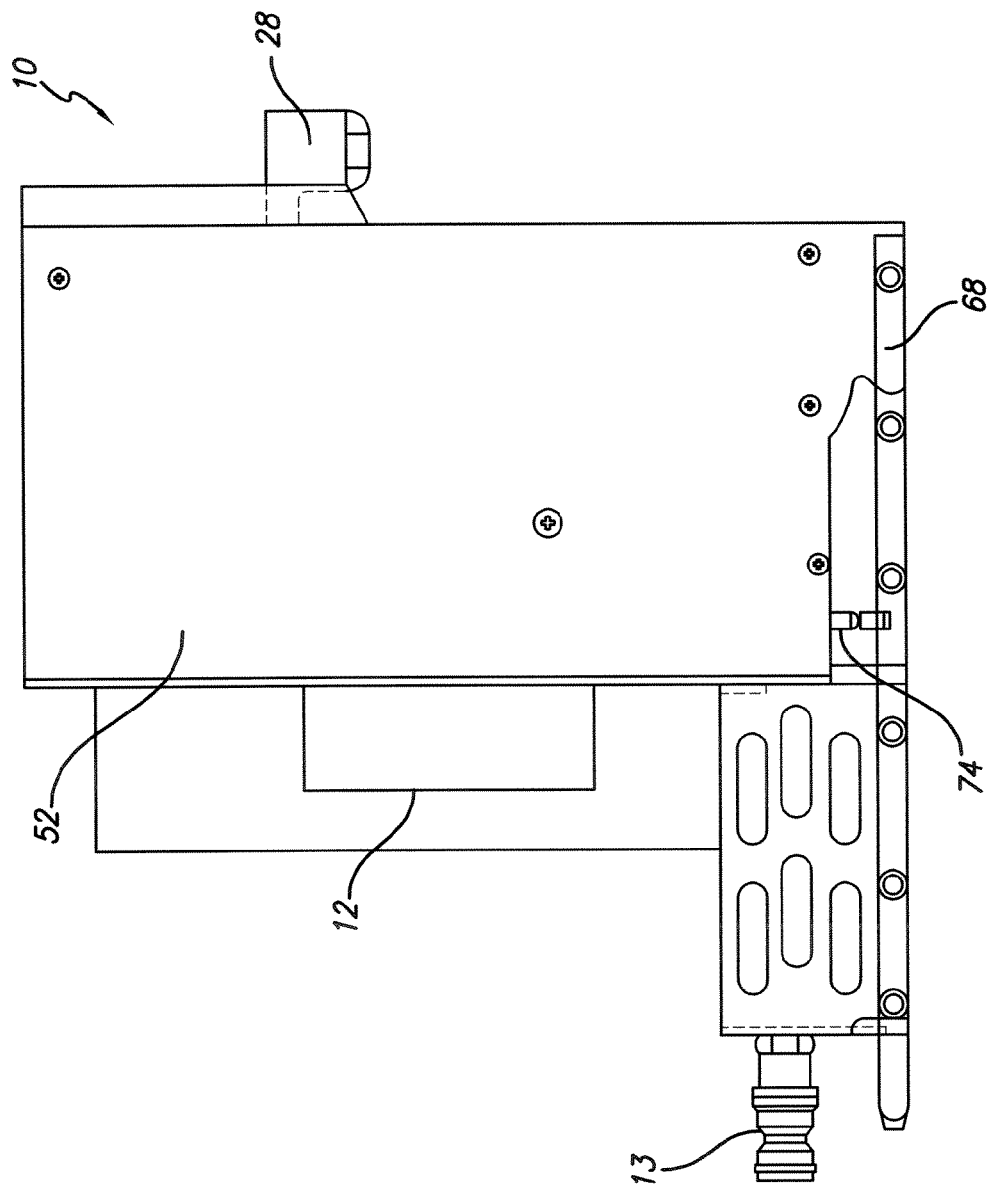
FIG. 4 is a side elevational view of the beverage maker of FIG. 1, depicting a drainage port and a retractable hot water faucet in an extended position.
Figure 5:
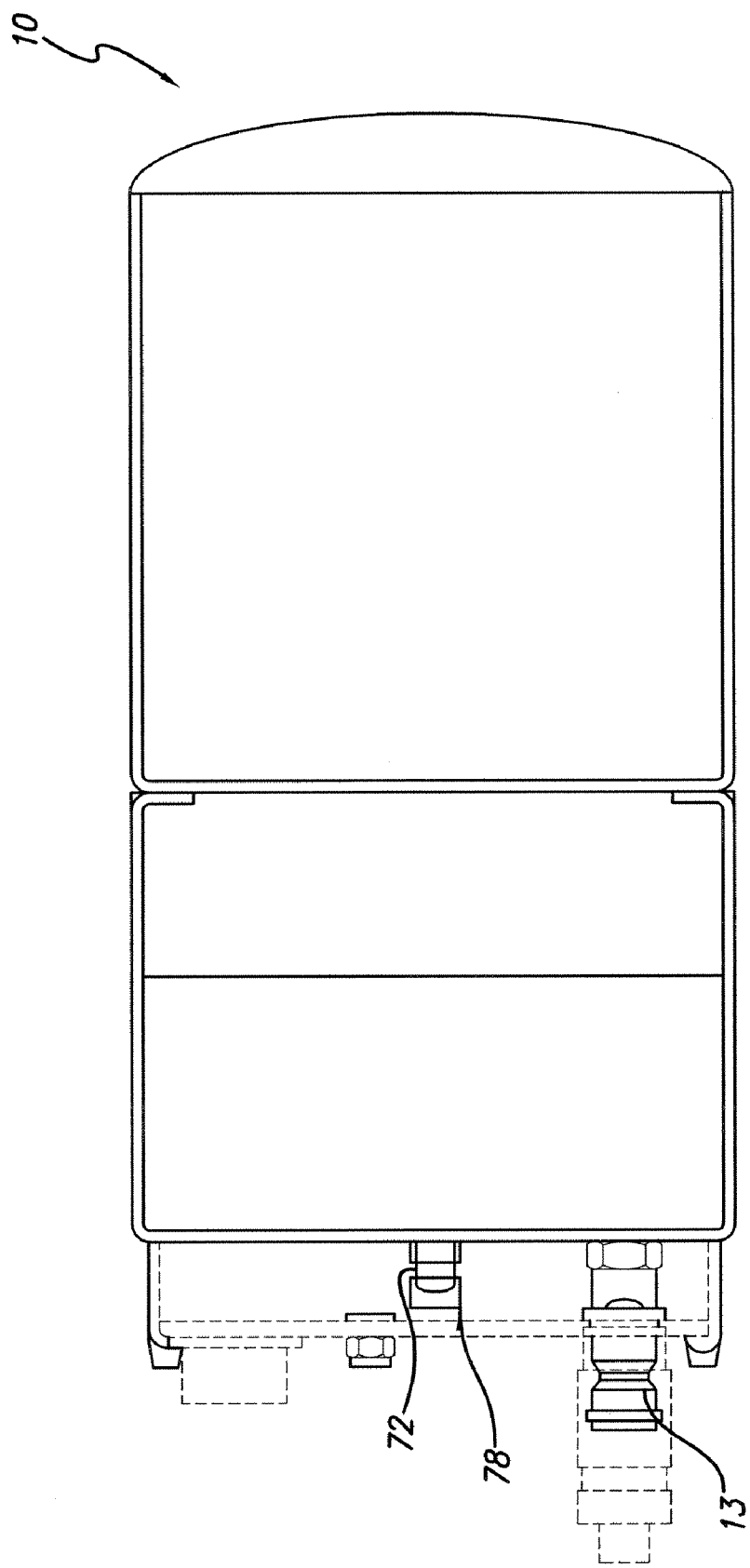
FIG. 5 is a top view of the beverage maker of FIG. 1.

With reference now to FIGS. 2, 4 and 5, the beverage maker 10 includes an extendible faucet 28 that can be used to dispense hot or cold water. The faucet extends from an upper portion of the housing 52, and it can be stowed within the housing when not in use. To deploy the faucet, a user presses against the faucet to trigger a spring mechanism to deploy it. A sensor 116 (FIG. 15) is operatively coupled to the faucet to detect whether the faucet is deployed or stowed.

The beverage maker 10 includes a pair of rails 68 and an alignment pin 67 for mounting the beverage maker within a conventional mounting assembly for a galley of a commercial airplane. As best seen in FIG. 2, a connector 69 for receiving electrical power is disposed on the back of the beverage maker.

The beverage maker further includes a drainage assembly 70 located downstream of the in-line heating assembly and that can drain water either through a connector port 72 or through a downwardly projecting drainage port 74, depending upon the configuration of the particular galley. The connector port 72 is configured to mate to a complementary port (not shown) within certain galleys that provides conductivity to the airplane's wastewater system 400 (FIG. 11). In other types of galleys, such ports are not provided. Instead, a drainage sump 401 is located below the beverage maker. If the connector port 72 is connected, then the drainage assembly drains through the connector port. If the connector port is not connected, then the drainage assembly drains through the drainage port 74.

In the exemplary embodiment, the connector port 72 is mechanically coupled to the drainage port 74. More particularly, the connector port includes a sleeve 78 that is mounted to displace when the connector port is connected to a complementary port. When the sleeve is displaced, a valve 76 of the drainage assembly 70 is positioned to allow liquid to pass through the connector port 72 and to inhibit liquid from passing through the drainage port 74. When the sleeve is in its default position, the valve is positioned to allow liquid to pass through the drainage port 74 and to inhibit liquid from passing through the connector port 72.

Figure 12:
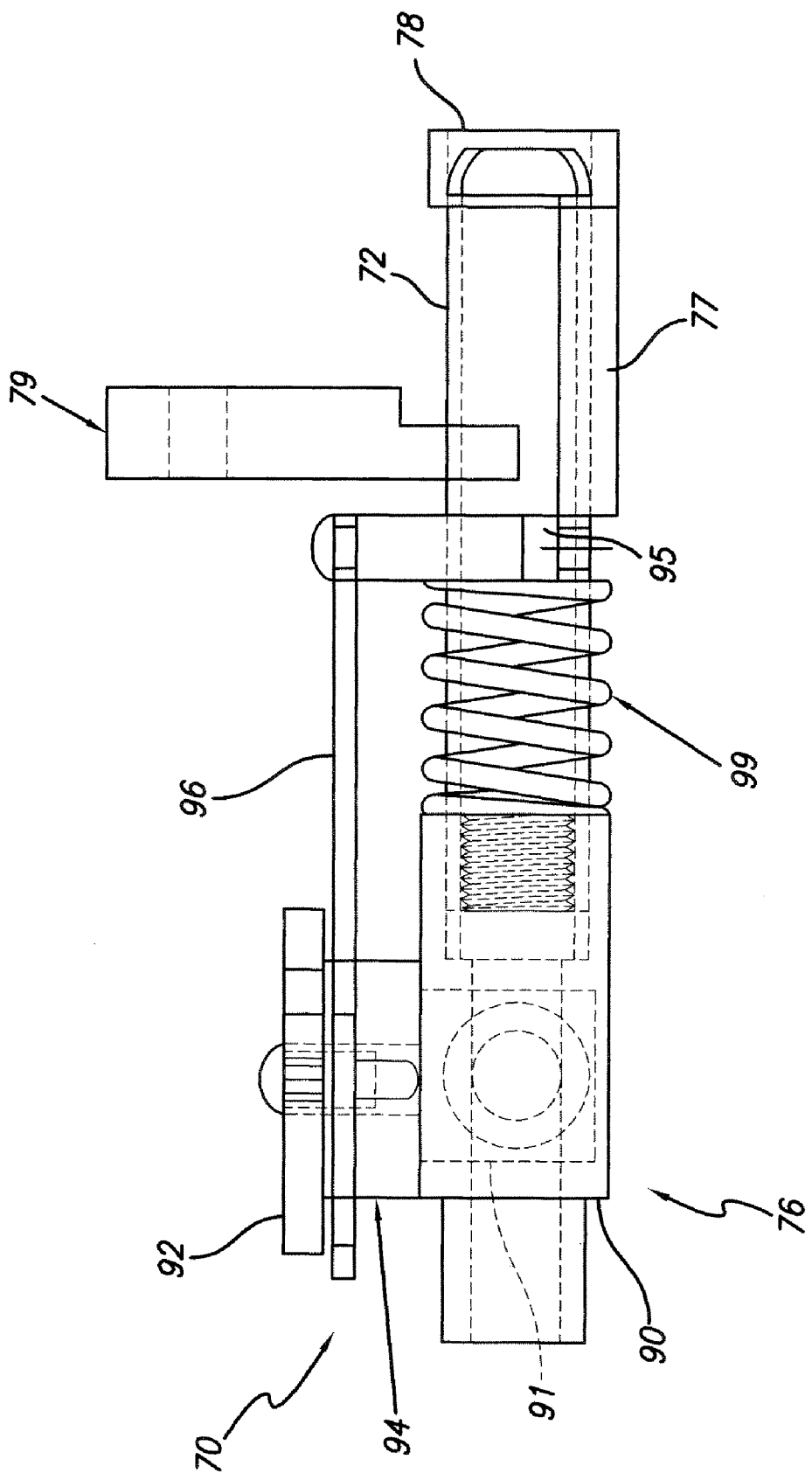
FIG. 12 is a side elevational view of the drainage assembly of FIG. 11.
Figure 13:
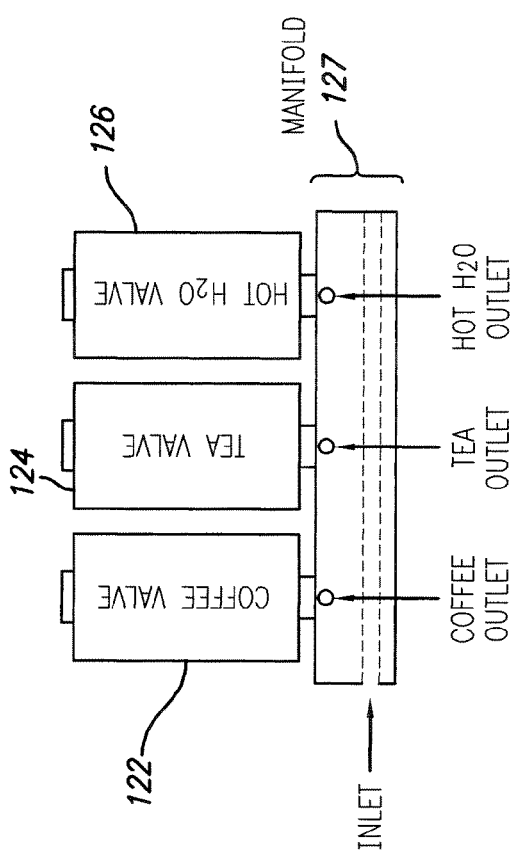
FIG. 13 is a simplified block diagram of a hot water valve assembly for the beverage maker of FIG. 1.

Referring to FIGS. 11 and 12, there is shown a top view and a side elevational view of a preferred embodiment of the drainage assembly 70. A bracket 79 secures the drainage assembly 70 to the beverage maker 10. The drainage assembly 70 comprises the connector port 72, the drainage port 74, and the valve 76.

The valve 76 comprises a main body 90 in which a rotating shaft 91 is disposed. The rotating shaft 91 is generally shaped like a cylinder and extends to the side out of the main body 90 to a rotation disc 92. A Phillips-head screw attaches the rotating shaft 91 to the face of the rotation disc 92. The rotation disc 92 is configured to have an inwardly extending slot 93 that extends from the perimeter of the disc toward the center of the disc. A retainer 94 surrounds most of the portion of the rotating shaft 91 that is outside of the main body 90. The retainer 94 extends from the main body 90 toward the rotation disc 92.

The valve 76 also comprises a plunger 77, at the end of which is the sleeve 78. The plunger 77 extends back from the sleeve 78 along one side of the connector port 72 to a plunger plate 95. Two screws attach the plunger 77 to the plunger plate 95. The plunger plate 95 is perpendicular to the plunger 77 and extends around the connector port 72 to the opposite side of the connector port from the plunger 77. A plunger slide 96 is attached to the side of the plunger plate 95 opposite from the plunger 77 by two Phillips-head screws. The plunger slide 96 is generally rectangular in shape and has a rectangular-shaped hollow 97 in the middle. The plunger slide 96 extends between the rotation disc 92 and retainer 94 at the end of the plunger slide opposite the plunger plate 95. The hollow 97 surrounds the rotating shaft 91. A cylinder-shaped pin 98 is attached to the plunger slide 96 proximate the end of the plunger slide opposite the plunger plate 95. The pin 98 extends away from the face of the plunger slide 96 and is positioned to engage the slot 93 in the rotation disc 92.

A compression spring 99 is positioned between the main body 90 and the plunger plate 95. If the connector port 72 is not connected to the airplane's wastewater system, then the compression spring 99 maintains the plunger plate 95 in a default position away from the main body 90. In this configuration, the rotating shaft 91 is oriented to allow liquid to pass through the drainage port 74 and to inhibit liquid from passing through the connector port 72.

When the connector port 72 is connected to the airplane's wastewater system, the complementary port (not shown) that provides conductivity to the airplane's wastewater system pushes the sleeve 78, plunger 77, and plunger plate 95 toward the main body 90, compressing the compression spring 99. The action of the sleeve 78, plunger 77, and plunger plate 95 moves the plunger slide 96 and pin 98 in a lateral direction, forcing the rotation disc 92 to pivot. The pivoting of the rotation disc 92 forces the rotating shaft 91 to pivot, directing any liquids that enter the valve 76 to pass through to the connector port 72 and inhibiting the liquids from passing through to the drainage port 74.

Figure 15:
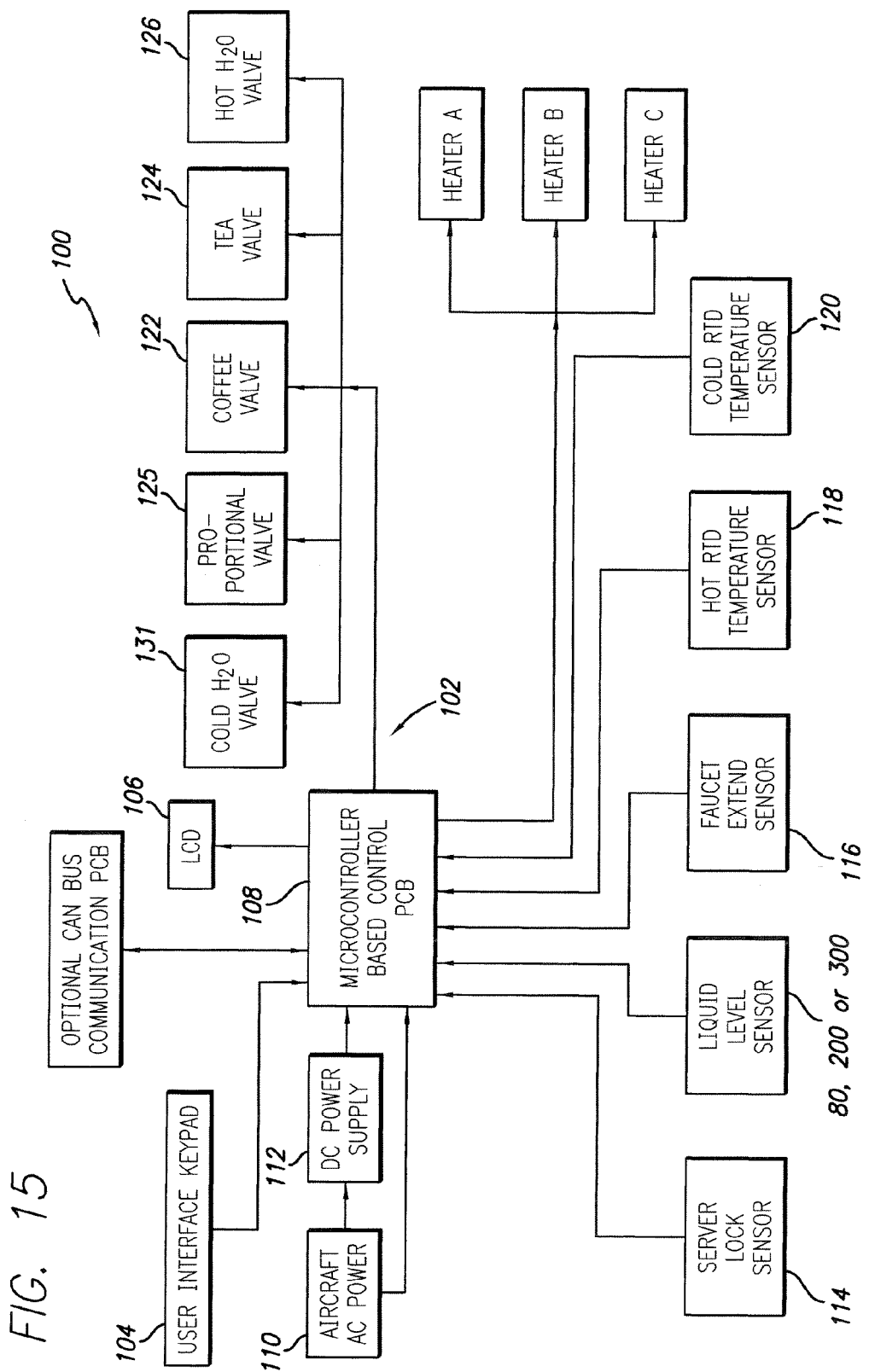
FIG. 15 is a simplified block diagram for a control system for the beverage maker of FIG. 1, depicting operational conductivity among various components.

With reference now to FIG. 15, a block diagram 100 is shown for a control system 102 for the beverage maker 10. The control system includes a user interface keypad 104 (FIG. 1), an LCD display 106 (FIG. 1), and a controller 108, which receives power from the aircraft AC power supply 110 and the DC power supply 112. The controller 108 receives input from the sensors about the beverage maker including the server locked sensor 114, an optical sensor assembly 80, 200 or 300, the extend sensor 116, the hot temperature sensor 118 and the cold temperature sensor 120.

The controller 108 regulates operation of the beverage maker 10, based in part on input received from the sensors. The controller is configured to send commands to the heating assembly 12 and the valves of the beverage maker, including the input valve 20, the output valve 24, the coffee valve 122, the tea valve 124, the proportional valve 125, the cold water valve 131, and the hot water valve 126. In this manner, the controller can regulate the operations of the beverage maker.

Figure 14:
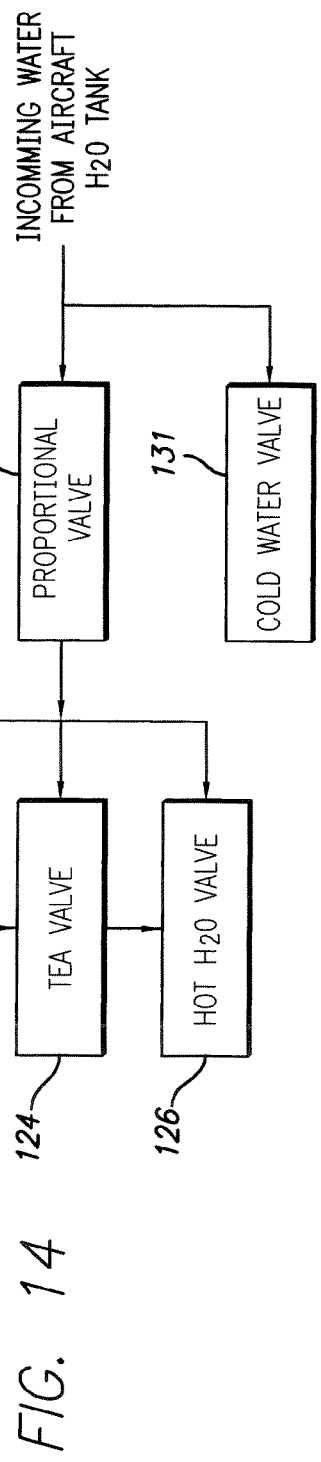
FIG. 14 is a simplified block diagram of a valve assembly for the beverage maker of FIG. 1.

Referring to FIGS. 14 and 15, the proportional valve 125 controls the flow rate to the three-station manifold 127 to which the coffee valve 122, the tea valve 124, and the hot water valve 126 are connected. More particularly, a three-station manifold from Asco Valve, Inc., having a place of business in Florham Park, N.J., is used. In this manner, the control system can regulate flow of water throughout the beverage maker. In a default state, the coffee valve is open to direct hot water to the filer tray 56. With the tea valve open, hot water bypasses the filter tray and hot water is dispensed directly into the serving container. The hot water valve directs water to the extendable faucet 28.

Figure 19:
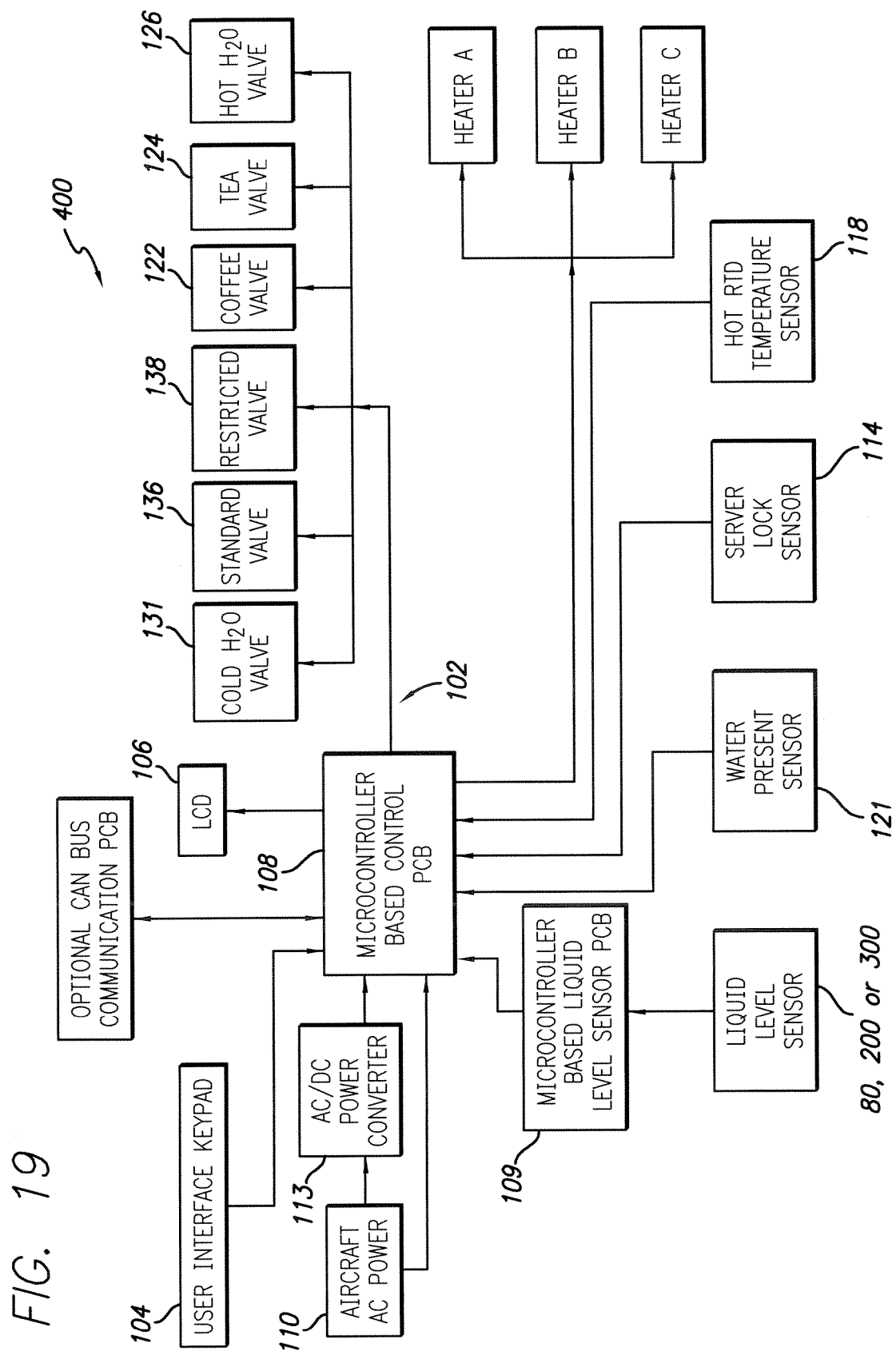
FIG. 19 is a simplified block diagram for a control system for the beverage maker of FIG. 1, depicting operational conductivity among various components.
Figure 20:
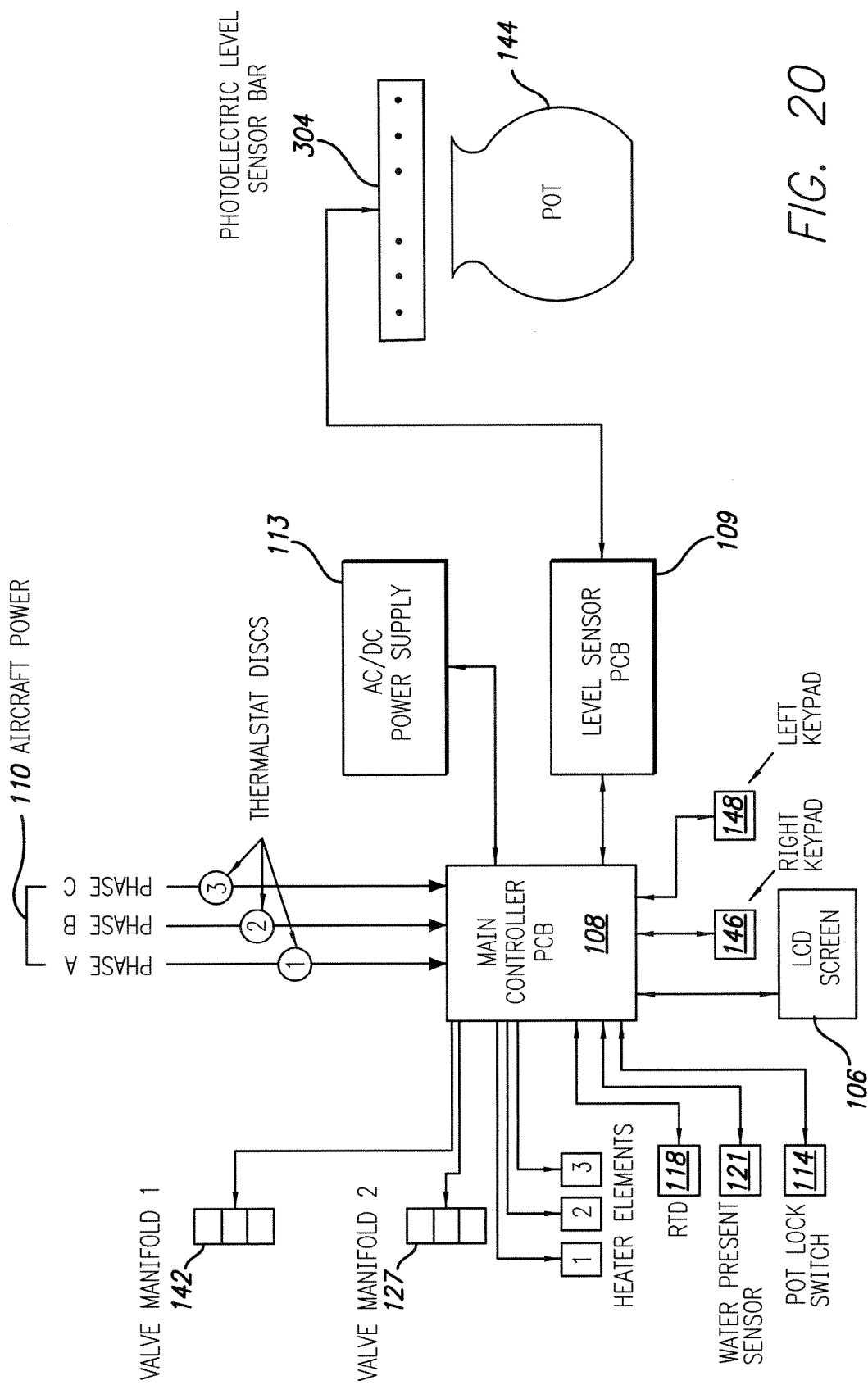
FIG. 20 is a simplified block diagram for a control system for the beverage maker of FIG. 1, depicting operational conductivity among various components.

Referring now to FIGS. 19 and 20, block diagrams 400 and 500 are shown for an alternative embodiment of a control system for the beverage maker 10. The control system 102 includes a user interface keypad 104 (FIG. 1), an LCD display 106 (FIG. 1), and a controller 108, which receives power from the aircraft AC power supply 110 and an AC/DC power converter 113. The controller 108 receives input from the sensors, including the server locked sensor 114, an optical sensor assembly 80, 200 or 300, the hot temperature sensor 118, and a water present sensor 121. The controller for the optical sensor assembly may be part of the controller 108, or there may be a separate printed circuit board 109 configured to communicate with the controller 108, as shown in FIGS. 19 and 20. The user interface keypad 104 may be split into a right keypad 146 and a left keypad 148, as shown in FIG. 20.

The controller 108 regulates operation of the beverage maker 10, based in part on input received from the sensors. The controller 108 is configured to send commands to the heating assembly 12 and to the valves of the beverage maker 10, including the input valve 20, the output valve 24, the coffee valve 122, the tea valve 124, the standard valve 136, the restricted valve 138, the cold water valve 131, and the hot water valve 126. In this manner, the controller 108 can regulate the operations of the beverage maker 10.

Figure 16:
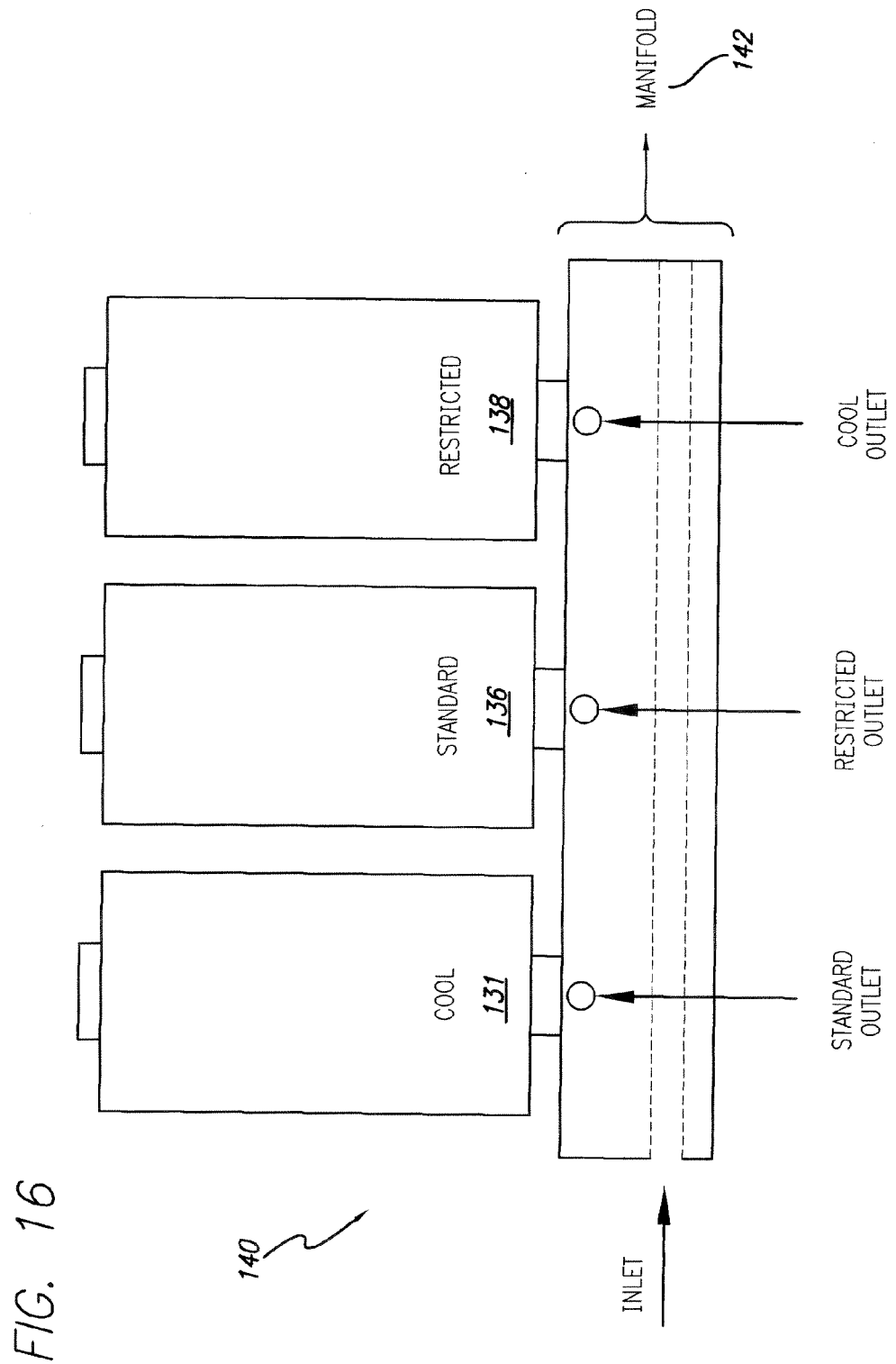
FIG. 16 is a simplified block diagram of a three-station valve and manifold valve assembly for the beverage maker of FIG. 1.
Figure 17:
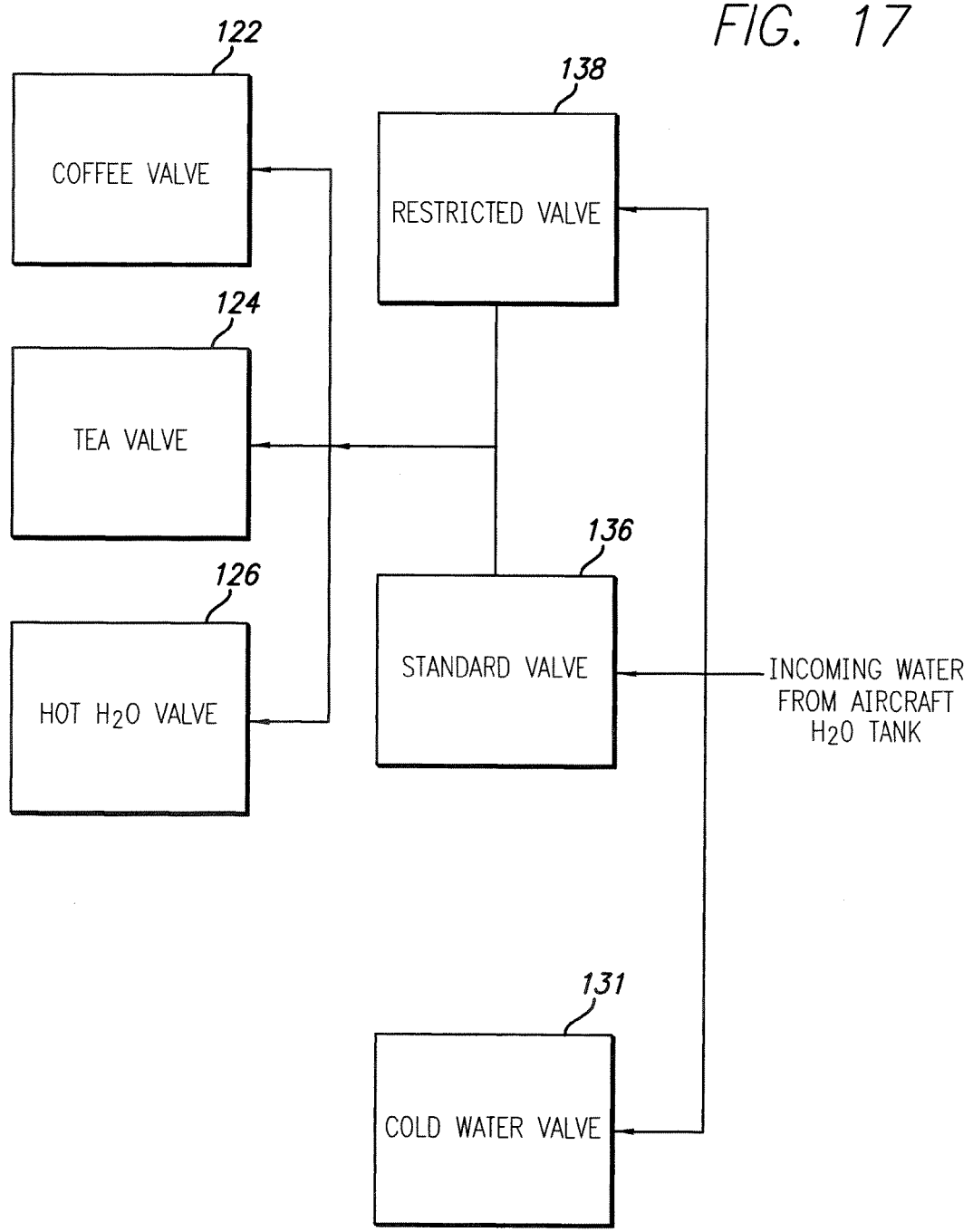
FIG. 17 is a simplified block diagram of a valve assembly for the beverage maker of FIG. 1.

Referring to FIG. 16, there is shown a simplified block diagram of a three-station manifold valve assembly 140 for the beverage maker 10. The three-station manifold valve assembly 140 comprises a three-station manifold 142, the cold water valve 131, the standard valve 136, and the restricted valve 138. More particularly, a three-station manifold from Asco Valve, Inc., having a place of business in Florham Park, N.J., is used. As shown in FIG. 17, the three-station manifold valve assembly 140 controls the flow rate to the three-station manifold 127, to which the coffee valve 122, the tea valve 124, and the hot water valve 126 are connected. In this manner, the controller 108 can regulate the flow of liquid throughout the beverage maker 10. In a default state, the coffee valve 122 is open to direct hot water to the coffee brew head 152 (FIG. 18). With the tea valve 124 open, hot water bypasses the brew head and is dispensed directly into the serving container 144 (FIG. 18). The hot water valve 126 directs water to the extendable faucet 28.

In the alternative embodiment shown in FIGS. 16-20, instead of the proportional valve 125, it is the three-station manifold valve assembly 140 that controls the flow rate to the three-station manifold 127. As shown in FIG. 18, water enters the three-station manifold valve assembly 140 from a water source 150. The cold water valve 131 is dedicated to dispensing cool or cold water to the faucet 28. The standard valve 136 and the restricted valve 138 control the flow of liquids through the in-line heating assembly 12, where the liquids are heated by the heating elements 36. After the liquid exits the in-line heating assembly 12, the liquid flows to the three-station manifold 127, where it is sent to either the coffee brew head 152, directly to the serving container 144, or to the faucet 28. During coffee brewing, tea brewing, and hot water dispensing, both the standard valve 136 and the restricted valve 138 are normally open. When the output water temperature is less than a prescribed temperature (e.g., 185° F.), the controller 108 closes the standard valve 136. Liquids continue to flow at a reduced flow rate through the restricted valve 138.

Figure 21:
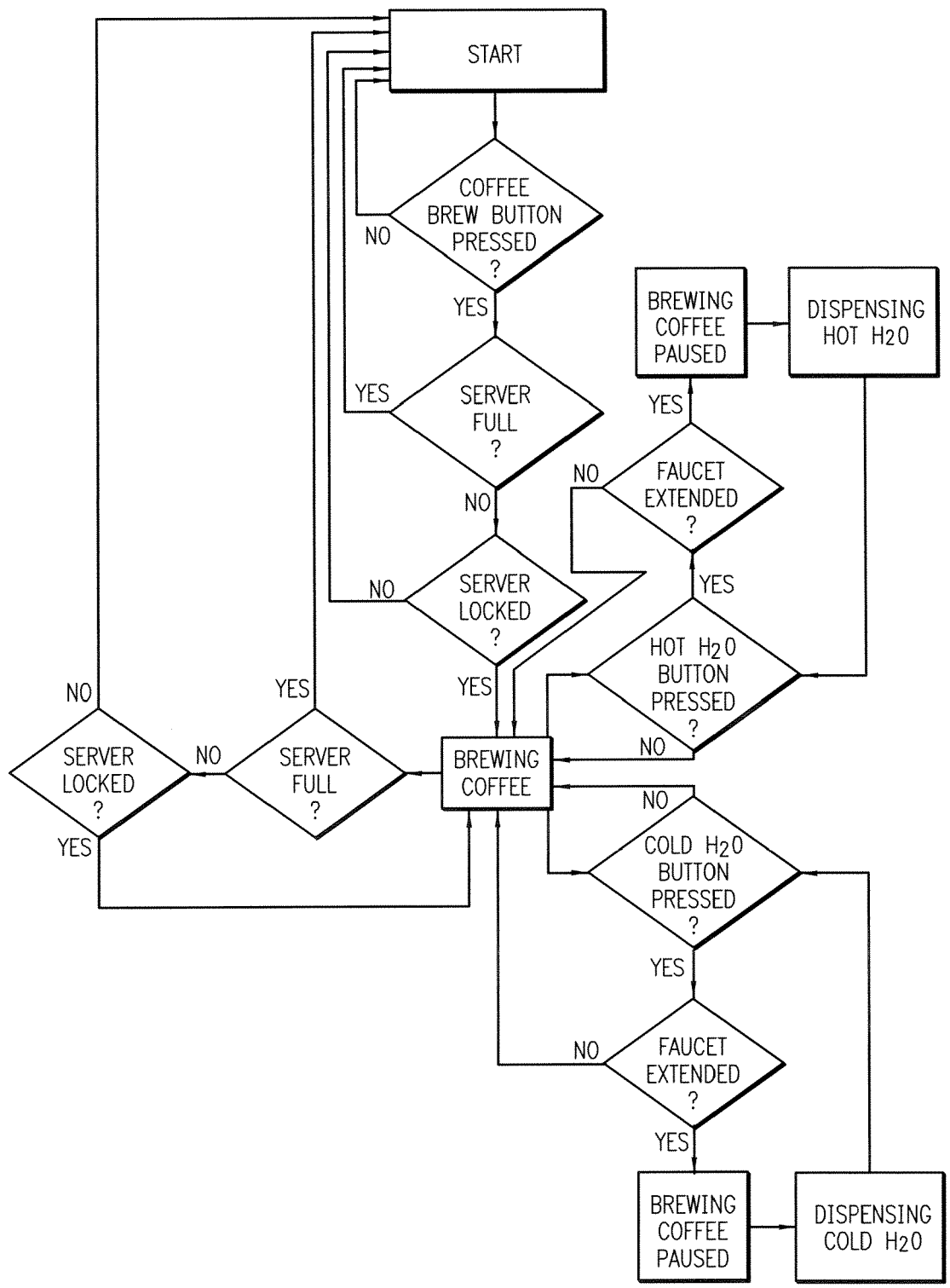
FIG. 21 a simplified block diagram depicting coffee brewing operation of the beverage maker of FIG. 1.

Referring now to FIG. 21, a block diagram depicting coffee brewing operation of the beverage maker 10 is shown. To initiate brewing, a user presses the coffee brew button 128. Prior to the start of brewing, the system will determine whether the serving container is fill and whether the serving container is locked in place. If the serving container is not full and is locked in place, brewing will be initiated. The controller will command the input and output valves 20 and 24 to allow water to pass through the heating assembly 12. The heated water then flows to the filter compartment to soak the coffee grounds therein.

In the exemplary embodiment, the heaters include temperature sensors that can measure temperature at various locations within the heating assembly. These measurements aid the control system in ensuring a desired water temperature. More particularly, the control system can adjust the temperature levels of the heating elements and can adjust the flow rate of water through the heating assembly by controlling the proportional valve.

As shown in the block diagram, brewing can be paused in several circumstances. For example, brewing is paused to dispense hot water from the extendable faucet 28. To do so, the hot water button 132 must be depressed and the faucet must be in its extended position. If these requirements are satisfied, then brewing is paused while the system dispenses hot water. Brewing can also be paused to dispense cold water, so long as the cold water button 134 is pressed and the faucet is extended.

As shown in the lower left-hand portion of the block diagram, brewing will continue so long as the serving container is not yet full and is still locked in place. If the liquid level sensor indicates that the serving container is full then brewing ends. The brewing will also stop if sensors indicate that the serving container is no longer locked in place.

Figure 22:
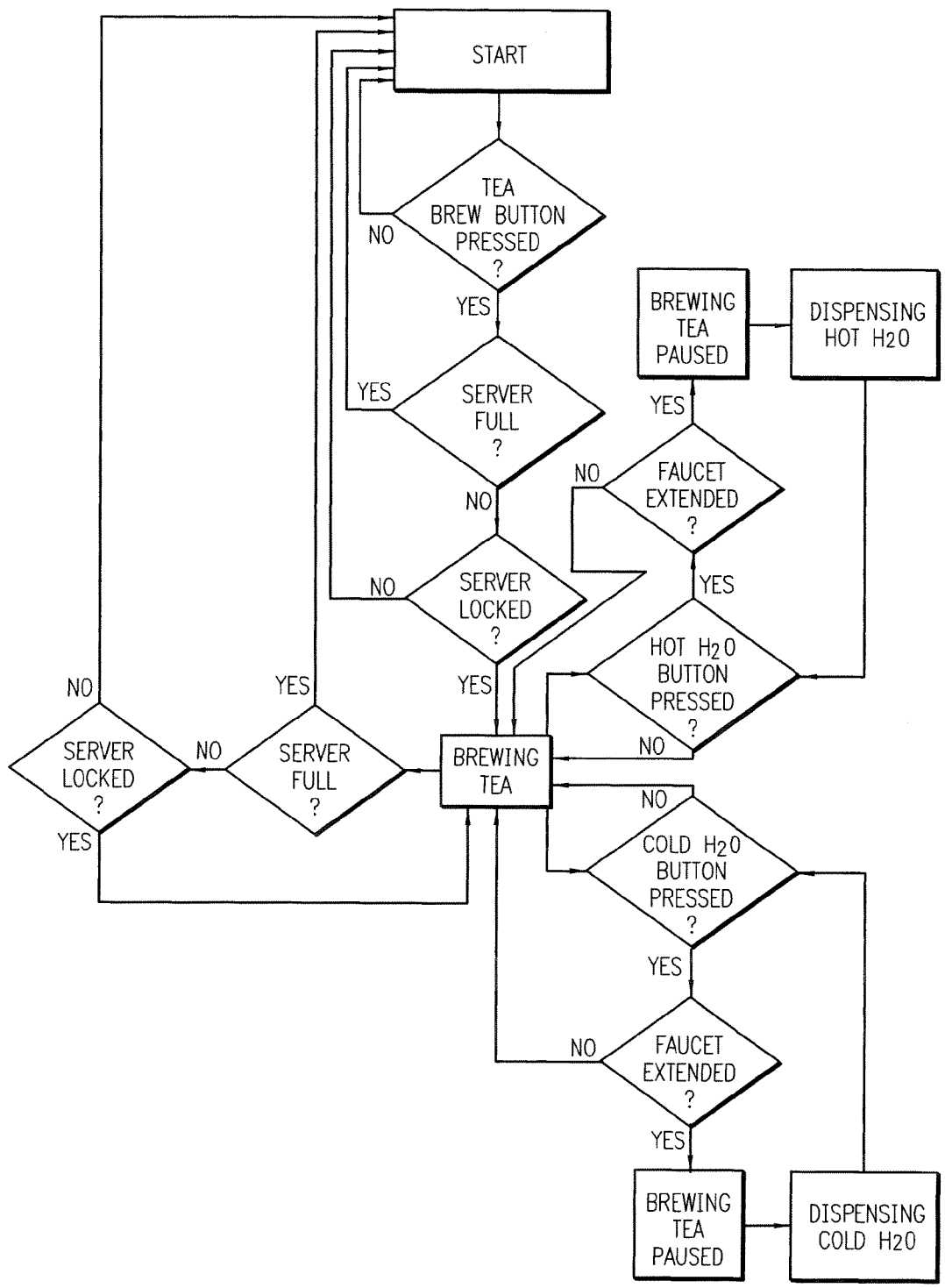
FIG. 22 a simplified block diagram depicting tea brewing operation of the beverage maker of FIG. 1.

Referring now to FIG. 22, a block diagram depicting tea brewing operation of the beverage maker 10 is shown. This process is similar to that of coffee brewing depicted in FIG. 21. Variations in tea brewing are primarily with regard to water temperature and brewing duration. To initiate tea brewing, a user presses the tea brew button 130. Once tea brewing is initiated, it can be paused to dispense either hot or cold water in the manner discussed above. In addition, the tea brewing process continues until the serving container is full or is unlocked.

Figure 24:
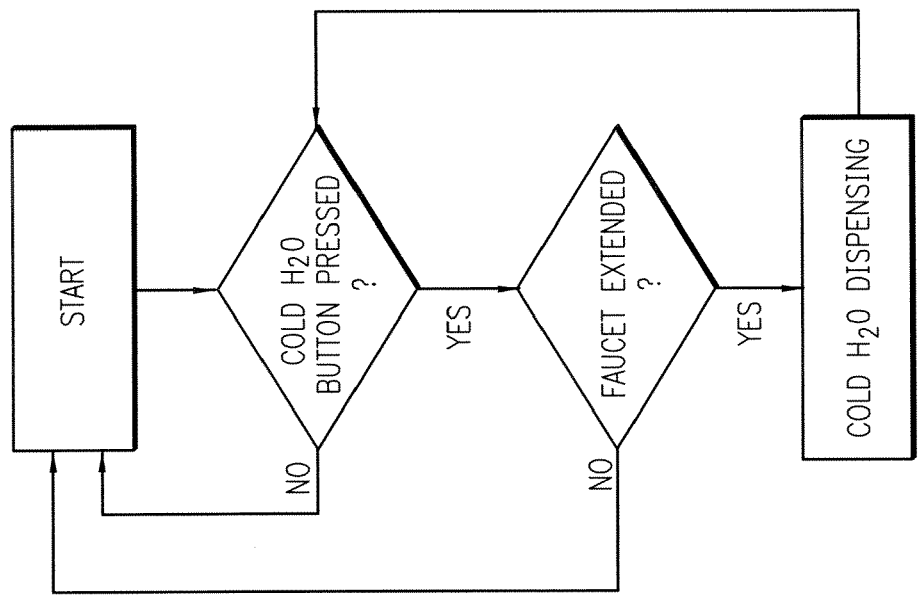
FIG. 24 a simplified block diagram depicting operation for dispensing cold water for the beverage maker of FIG. 1.
Figure 23:
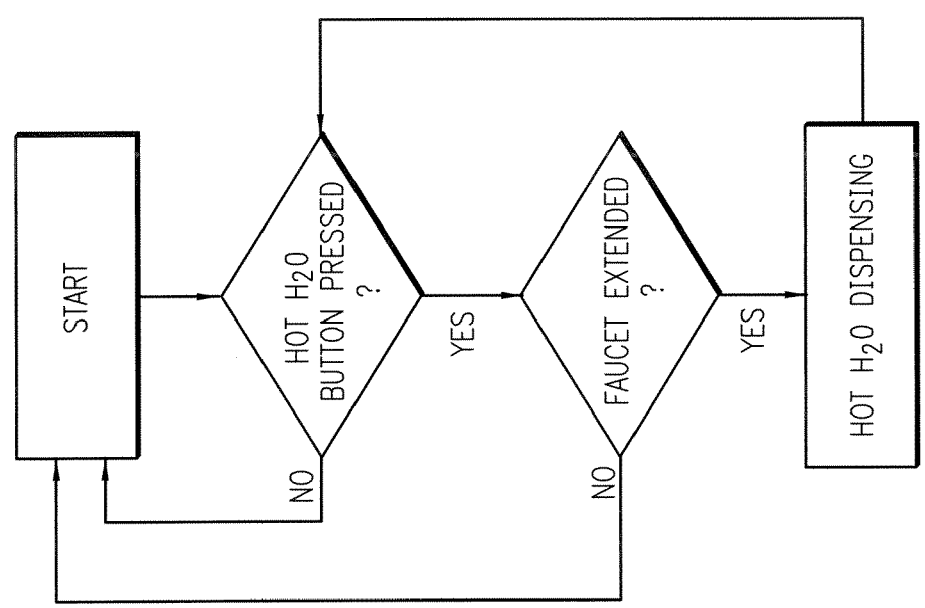
FIG. 23 a simplified block diagram depicting operation for dispensing hot water for the beverage maker of FIG. 1.

FIGS. 23 and 24 depict block diagrams for dispensing hot and cold water, respectively. As mentioned above, the water is provided through the extendable faucet. Depending upon which button is pressed, the control system will command the appropriate valve to provide either hot or cold water, as selected. However, the control system will not allow water to pass to the faucet if the faucet is not deployed.

Figure 25:
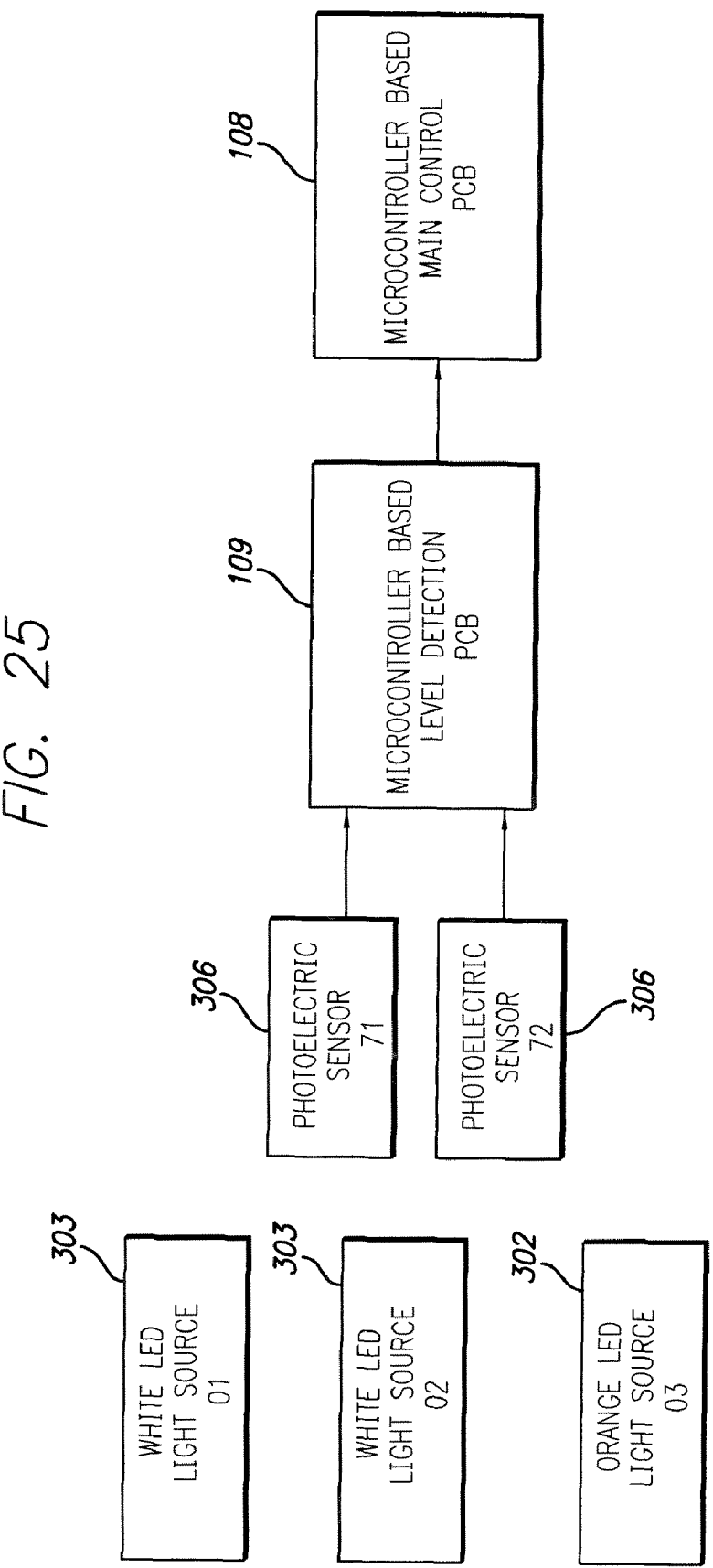
FIG. 25 is a simplified block diagram depicting the three-LED optical sensor assembly of FIG. 8.
Figure 26:
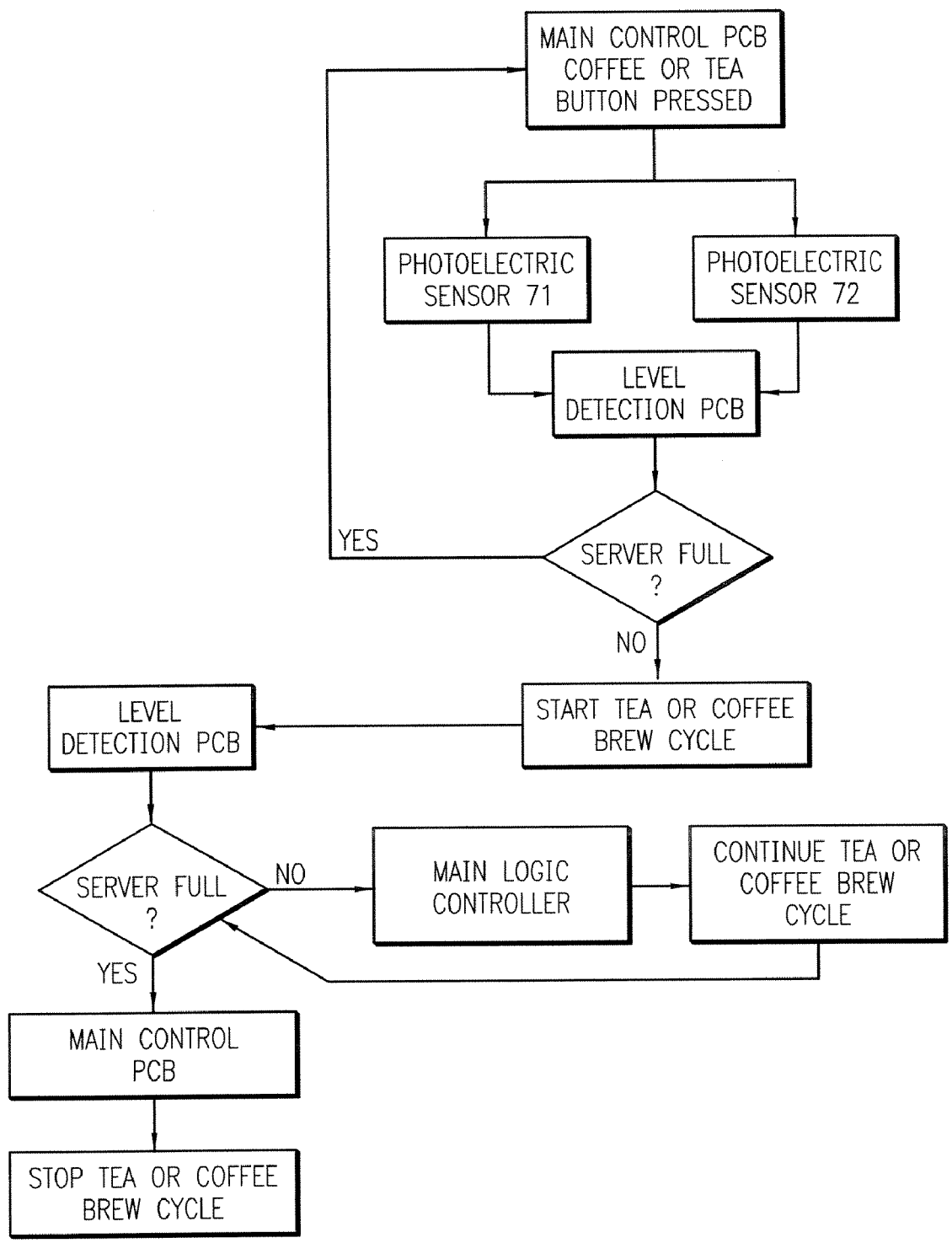
FIG. 26 is a simplified block diagram depicting operation of the three-LED optical sensor assembly of FIG. 8.

FIGS. 25 and 26 depict block diagrams for the three-LED embodiment of the optical sensor assembly. When either the coffee brew button 128, tea brew button 130, or hot water button 132 is pressed, the LEDs 302 and 303 direct light onto the upper surface of the liquid in the serving container 144. The two photoelectric sensors 306 sense the intensity of the light reflecting from the surface of the liquid, which depends upon the changing distance between the photoelectric sensors and the fluid level. The LED 302 emits light at an orange wavelength. The two LEDs 303 emit white light. Although visible light is preferably used, the present invention encompasses the use of other wavelengths, including infrared and ultraviolet wavelengths.

The optical sensor assembly 300 communicates with the control system 102, which can recognize multiple levels of liquid in the serving container 144. In a preferred embodiment, the control system 102 uses software to recognize the multiple levels of liquid in the serving container 144 and to determine when the serving container is appropriately full of liquid. The software evaluates the signal strength from the photoelectric sensors 306 and determines, based upon the signal strength, the approximate level of the liquid in the serving container 144. If the serving container 144 is not full, then the control system 102 maintains the flow of liquid through the heating assembly 12. When the signal strength reaches a certain level, the software is able to determine that an appropriate level of liquid in the serving container 144 has been reached and that the input valve 20 and output valve 24 should be shut, stopping the flow of liquid through the heating assembly 12. The software also causes a message to appear on the LCD display 106 when the appropriate liquid level in the serving container 144 has been reached. Using software helps in determining the appropriate level of liquid in the serving container 144, although the present invention encompasses other means of determining the appropriate level, including firmware.

The software is also able to determine, based upon the signal strength from the photoelectric sensors 306, whether the serving container 144 is already full when coffee brew button 128, tea brew button 130, or hot water button 132 is pressed. In that case, the software prevents the flow of liquid through the heating assembly 12. The software also causes a message to appear on the LCD display 106 informing the user of the condition.

The software is additionally able to determine, based upon the signal strength from the photoelectric sensors 306, whether an unacceptably high volume of fluid is present in the serving container 144. In that case, the software directs the control system 102 to shut the input valve 20 and output valve 24, stopping the flow of liquid through the heating assembly 12. The software also causes a message to appear on the LCD display 106 informing the user of the condition.

The software is additionally able to determine whether air turbulence or another condition has prevented any of the photoelectric sensors 306 from working properly. In that case, the software directs the control system 102 to shut the input valve 20 and output valve 24, stopping the flow of liquid through the heating assembly 12. The software also causes a message to appear on the LCD display 106 informing the user of the condition.

Although the beverage maker 10 is referenced for use in commercial airplanes, other embodiments are contemplated for use in various other settings to include other types of transportation vehicles (trains, recreation vehicles, and so on) as well as household use.

It should be appreciated from the foregoing that the present invention provides a beverage maker having a number of desirable features, including, e.g., an in-line heating assembly, an improved control system, a configurable drainage assembly, a deployable faucet, a container locking mechanism, a sensor assembly for liquid level within a container, among others, any of which, singly or in combination, satisfy previously unmet needs.

Although the invention has been described in detail with reference only to the exemplary embodiments, those skilled in the art will appreciate that various other embodiments can be provided without departing from the scope of the invention.

What is claimed is:

1. A beverage maker having an in-line heating assembly for heating a liquid to make hot beverages, the beverage maker comprising:
  a heating body that defines a flow path for heating the liquid, the flow path having a first end and a second end;
  at least one valve for regulating the flow of the liquid along the flow path;
  a plurality of heaters disposed between the first end of the flow path and the second end of the flow path, for heating the liquid to a desired temperature;
  at least one temperature sensor configured to produce a temperature signal indicative of the temperature at a prescribed location within the heating body;
  a control system configured to receive the temperature signal from the temperature sensor and to regulate the plurality of heaters;
  a coffee valve, a tea valve, a hot water valve, and a manifold to which the coffee valve, the tea valve and the hot water valve are connected;
  an extendable faucet connected to the hot water valve and configured to be movable between a stowed position and a deployed position; and
  a faucet sensor operatively coupled to the extendable faucet, to produce a control signal indicating whether the extendable faucet is disposed in its deployed position or in its stowed position; and
  wherein the control system (i) is operatively connected to the coffee valve, tea valve, and hot water valve, to control which valve the liquid is allowed to flow through; (ii) comprises a user interface including a hot water button, wherein manual actuation of the hot water button initiates the flow of hot water through the hot water valve and prevents liquid from flowing through the coffee valve and the tea valve; and (iii) is configured to allow hot water to flow through the hot water valve only when the control signal indicates that the extendable faucet is disposed in its deployed position.

2. A beverage maker comprising:
  an in-line heating assembly that defines a flow path for heating a liquid to make hot beverages, the flow path having a first end and a second end;
  at least one valve for regulating the flow of the liquid along the flow path;
  a control system configured to provide a control signal to the at least one valve; and
  an optical sensor assembly configured to send signals to the control system;
  wherein the optical sensor assembly and control system are configured to detect at least one level of liquid located within a serving container placed within the beverage maker;
  wherein the control system evaluates the signals sent by the optical sensor assembly to determine whether an appropriate liquid level in the serving container has been reached;
  wherein the optical sensor assembly comprises at least three light sources positioned above the serving container and at least two detectors positioned above the serving container and spaced apart from the at least one light source; and
  wherein at least one of the detectors is oriented to receive light emitted from the at least one of the light sources and reflected from the surface of liquid disposed in the serving container.

3. A beverage maker comprising:
  an in-line heating assembly that defines a flow path for heating a liquid to make hot beverages, the flow path having a first end and a second end;
  at least one valve in fluid communication with an end of the flow path, for regulating the flow of the liquid along the flow path; and
  a drainage assembly located downstream of the heating assembly and in fluid communication therewith, the drainage assembly comprising a connector port configured to connect to an airplane wastewater system and a drainage port configured to drain at least some of the liquid into a drainage sump;
  wherein the drainage assembly is configured so that:
    if the connector port is not connected to an airplane wastewater system, then the drainage assembly drains at least some of the liquid through the drainage port, not through the connector port; and
    if the connector port is connected to an airplane wastewater system, then the drainage assembly drains at least some of the liquid through the connector port, not through the drainage port; and
  wherein the connector port comprises a sleeve that is mounted to displace when the connector port is connected to an airplane wastewater system.

* * * * *